W. B. CLARK & F. J. PRITCHARD.
APPARATUS FOR RECORDING AND COMPILING STATISTICAL DATA.
APPLICATION FILED JUNE 12, 1916.
1,261,490.
Patented Apr. 2, 1918.
8 SHEETS—SHEET 1.
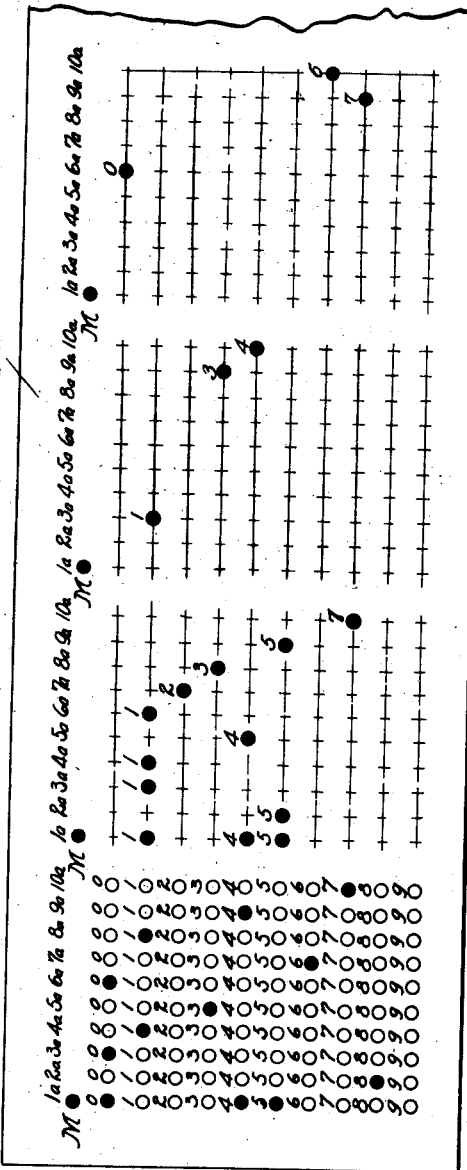
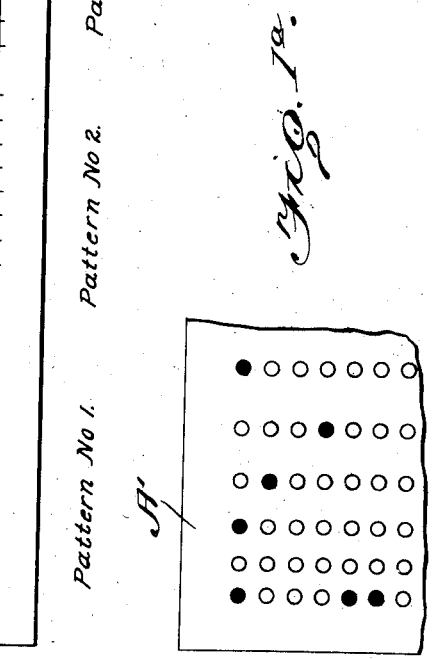

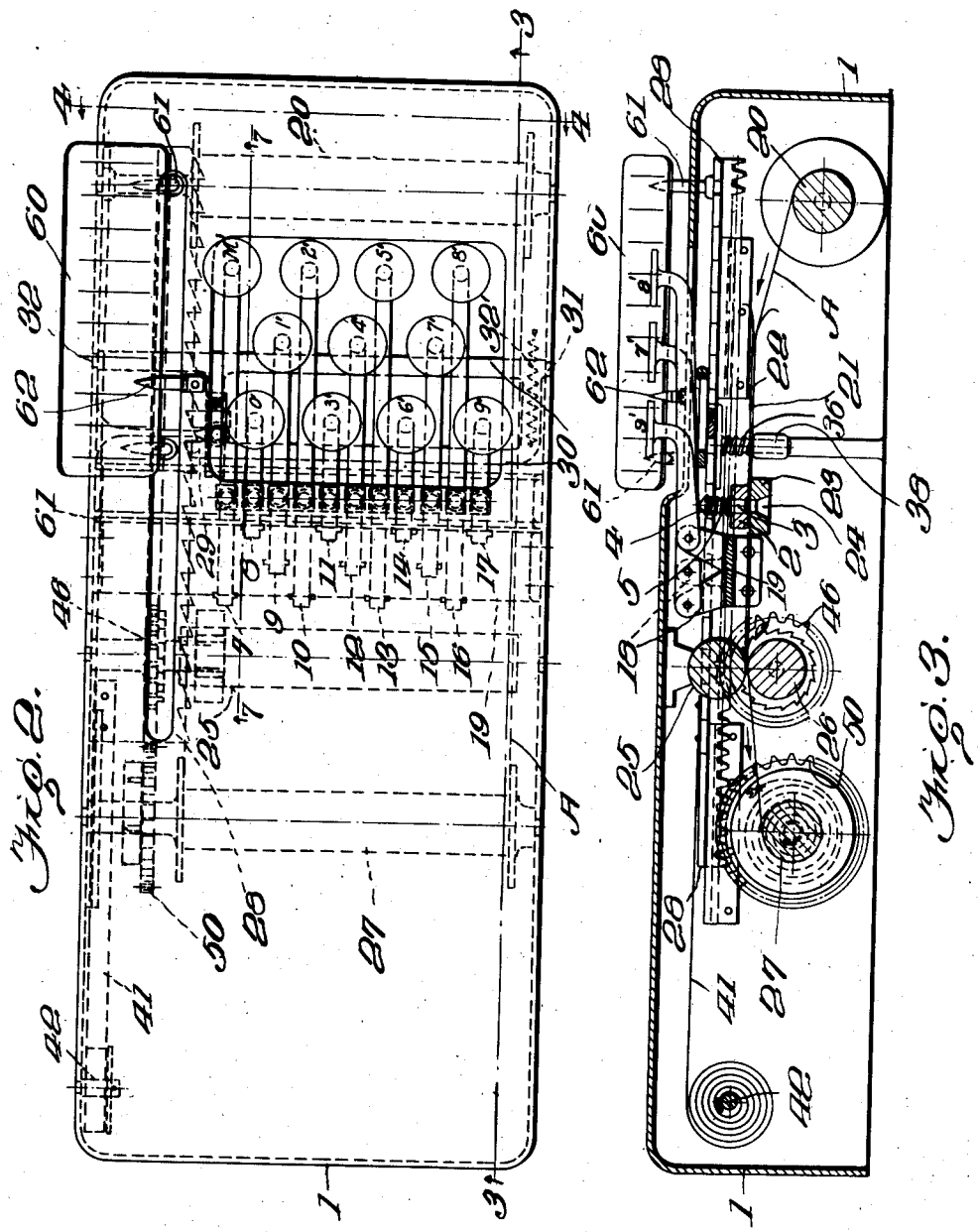

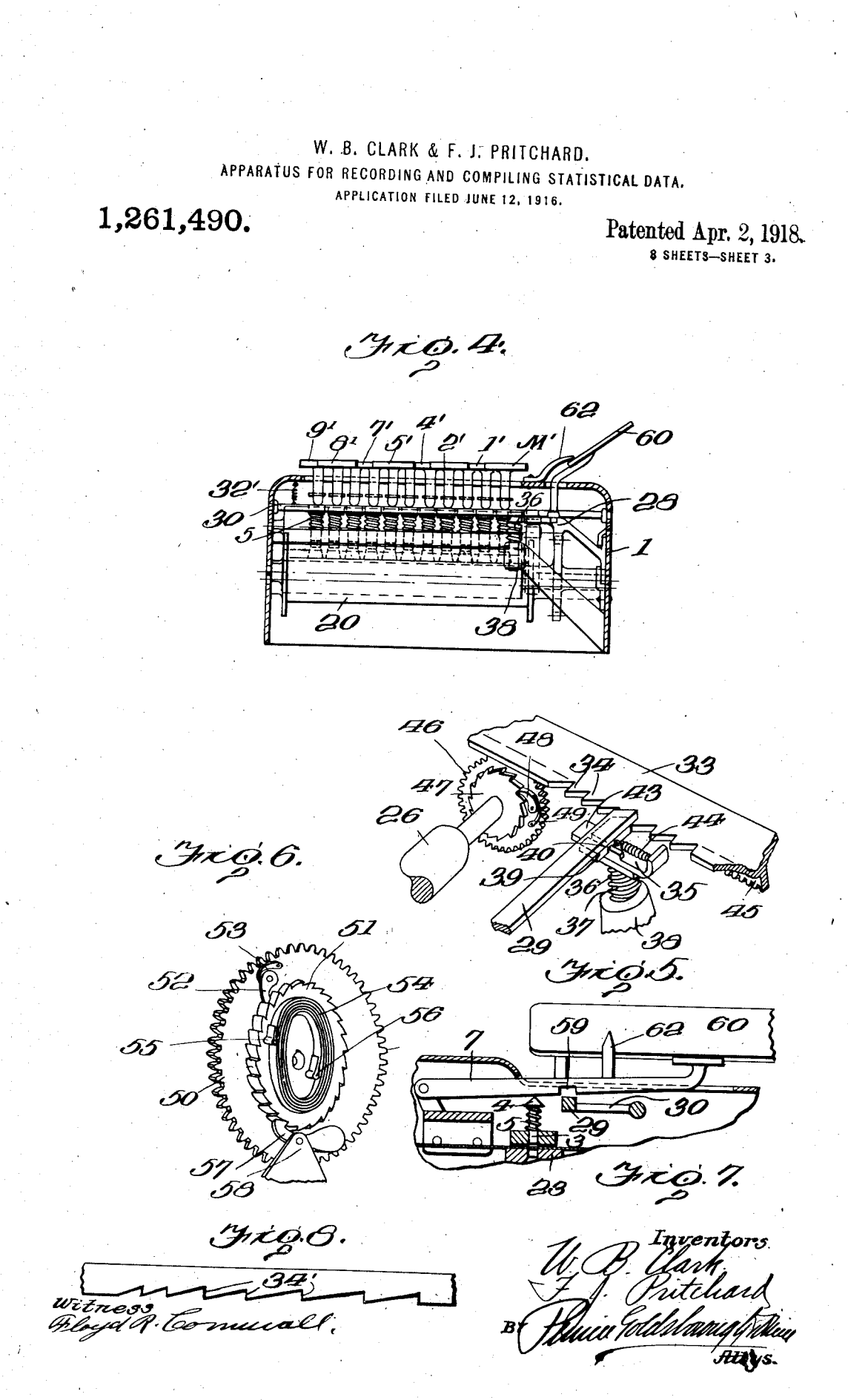

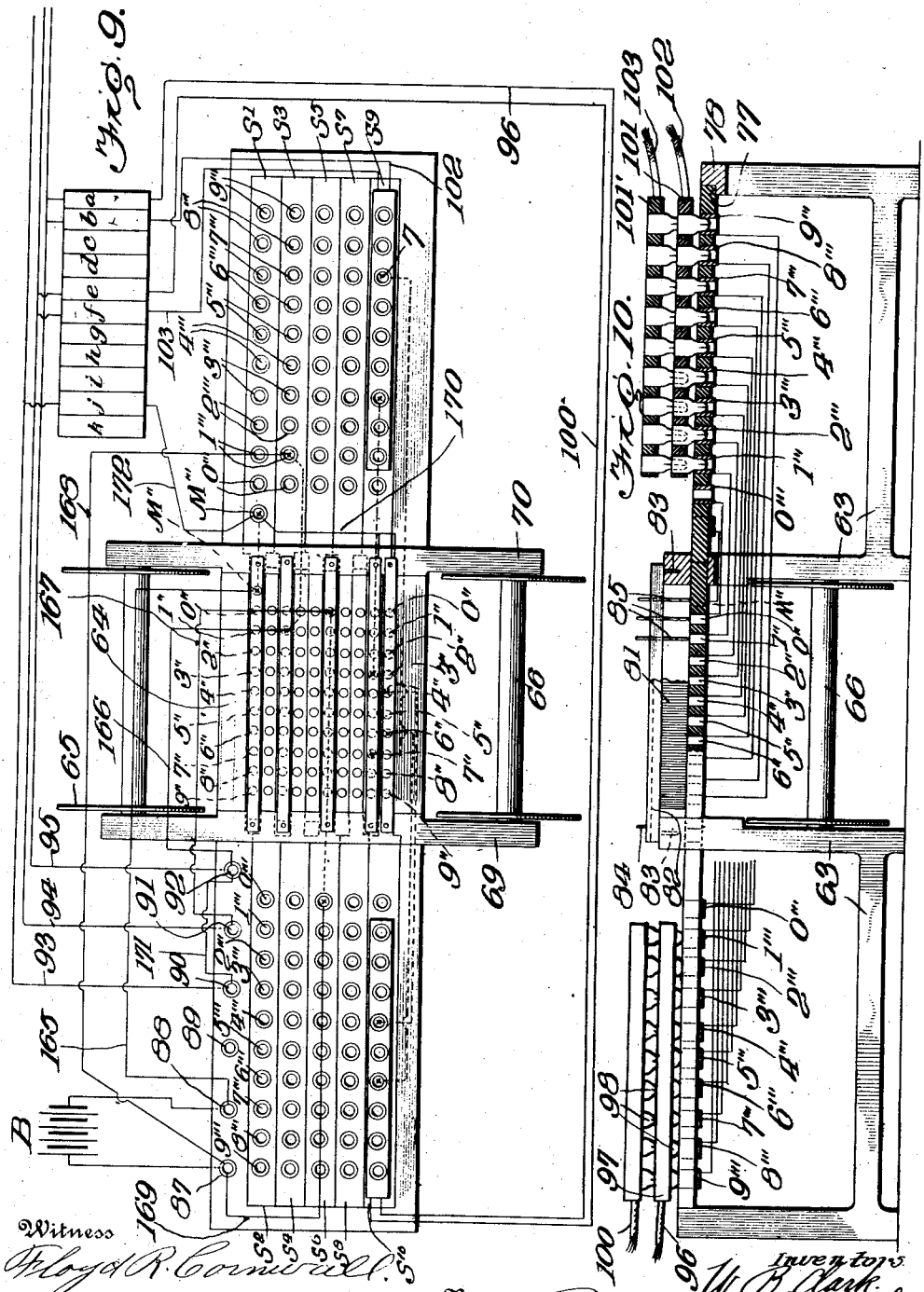

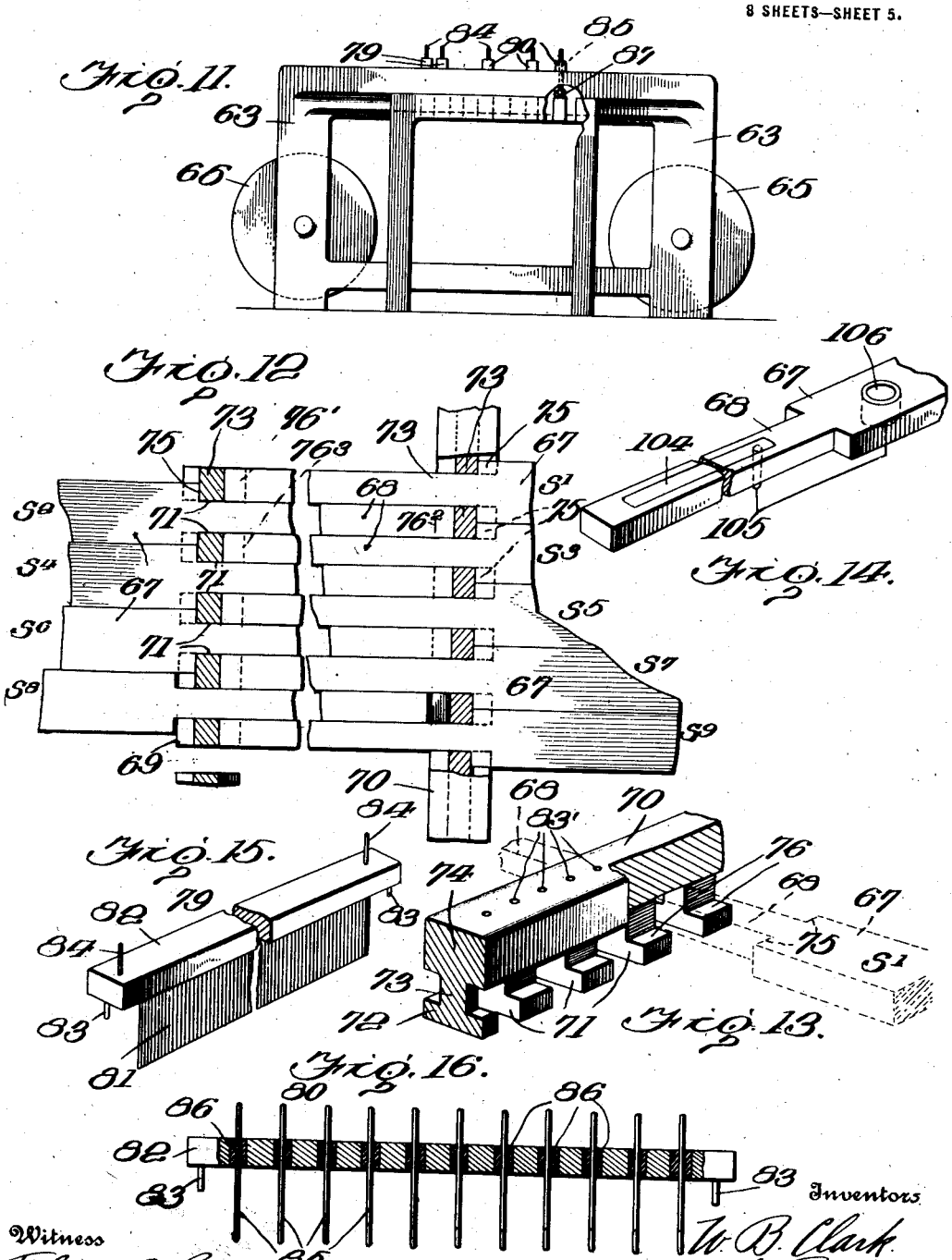

W. B. CLARK & F. J. PRITCHARD.
APPARATUS FOR RECORDING AND COMPILING STATISTICAL DATA.
APPLICATION FILED JUNE 12, 1916.
1,261,490.
Patented Apr. 2, 1918.
8 SHEETS—SHEET 6.
Fig. 17.
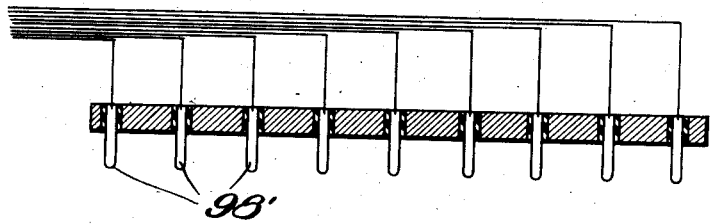
Fig. 18.
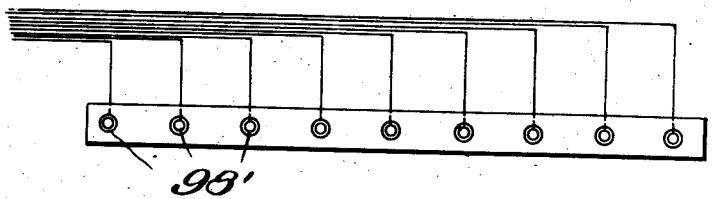
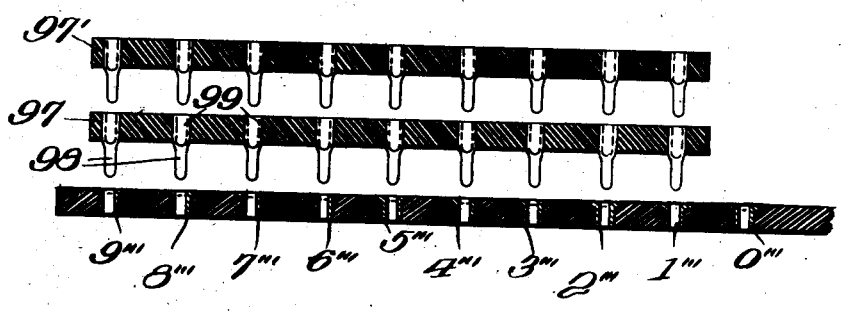
Fig. 19.
Witness
Floyd R. Cornwall.
Inventors
W. B. Clark
F. J. Pritchard
by Philip Goldsborough & Neill
Attorneys

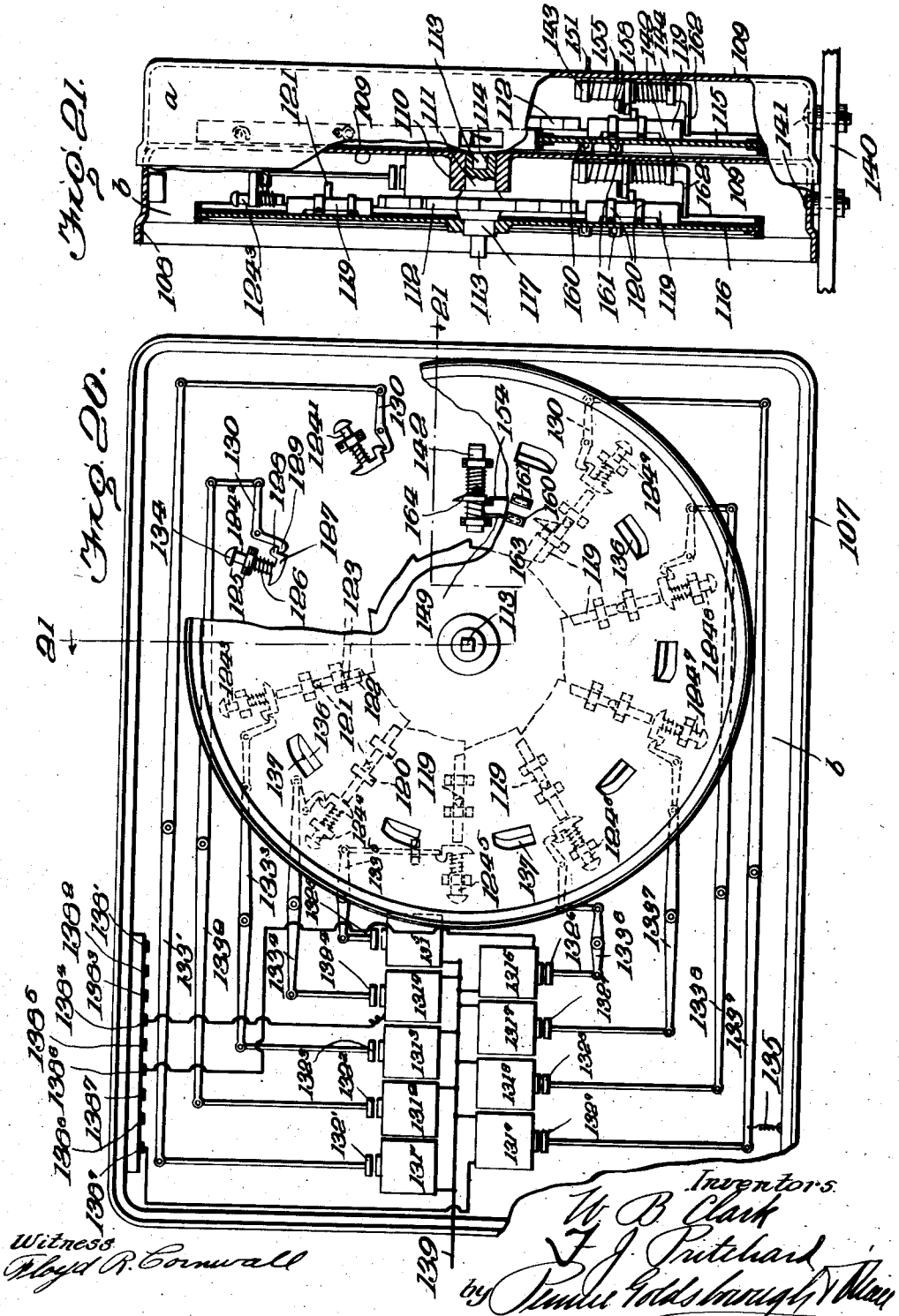

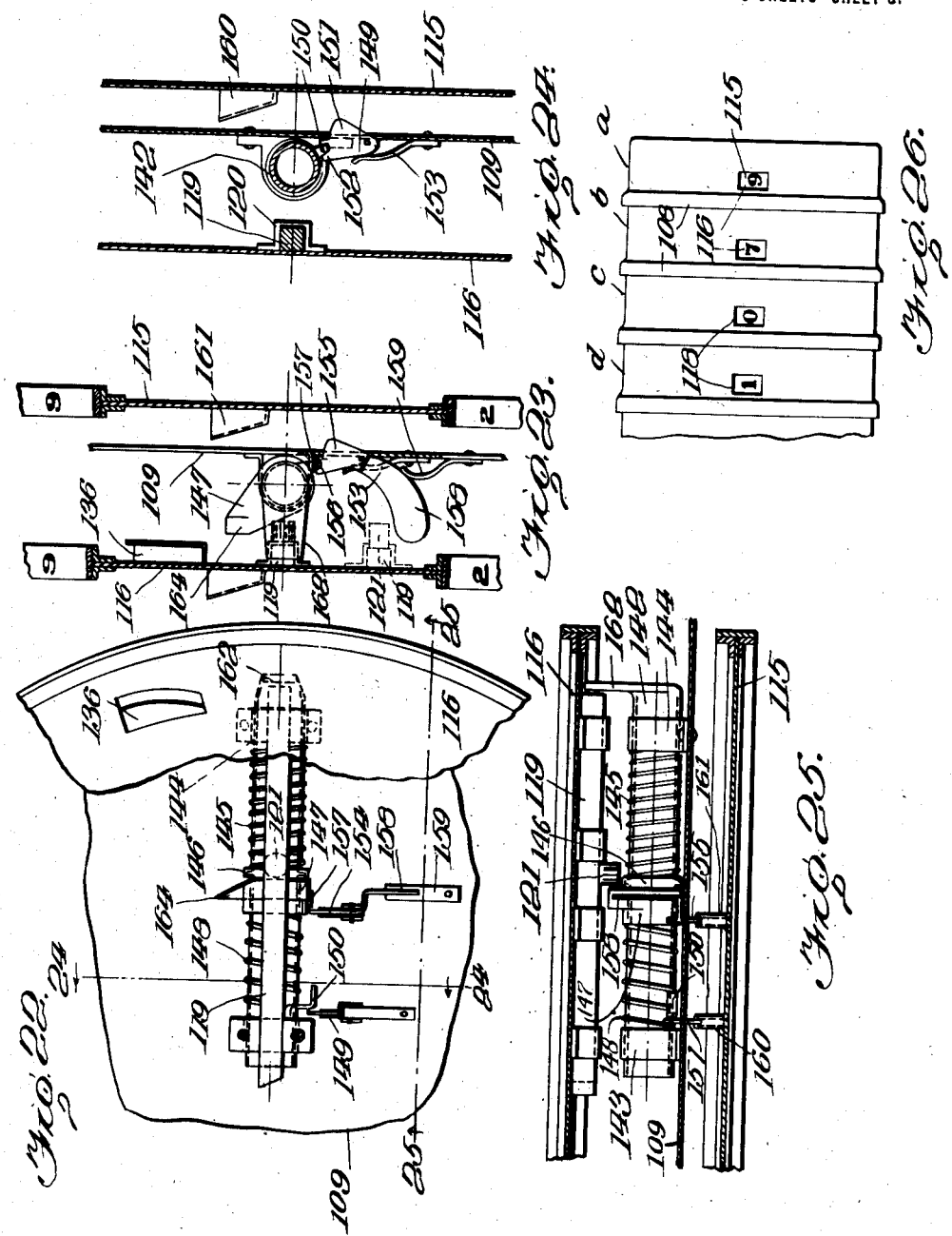

UNITED STATES PATENT OFFICE.

WAYLAND BLAIR CLARK AND FREDERICK J. PRITCHARD, OF WASHINGTON, DISTRICT OF COLUMBIA.

APPARATUS FOR RECORDING AND COMPILING STATISTICAL DATA.

1,261,490.  Specification of Letters Patent.  Patented Apr. 2, 1918.

Application filed June 12, 1916. Serial No. 103,235.

*To all whom it may concern:*

Be it known that we, WAYLAND B. CLARK and FREDERICK J. PRITCHARD, citizens of the United States, residing in the city of Washington, District of Columbia, have invented certain new and useful Improvements in Apparatus for Recording and Compiling Statistical Data; and we do hereby declare the following to be a full, clear, and exact description of the invention, such as will enable others skilled in the art to which it appertains to make and use the same.

The present invention relates to apparatus for recording and accumulating or compiling statistical data, and has for its main object to provide improved apparatus of this character involving such novel features of construction and operation as will render the apparatus capable of recording and collecting or accumulating data of practically any kind and in practically an unlimited number of different ways. In other words, the data may be recorded in a large number of predetermined ways and may later be accumulated and registered by mechanism which is capable of selecting and registering a portion of the recorded data or all of the same, depending upon how said mechanism is set to operate. The setting of the accumulating and registering mechanism for the recorded data may be such that various combinations of recorded data may be accumulated and registered, such combinations being practically infinite in number. The possibilities of the apparatus are, therefore, so unlimited as to render the apparatus of vast commercial importance for uses analogous to that which will hereinafter be specifically set forth.

The apparatus itself comprises three main parts or groups of mechanism. The first part is a so-called punching machine through which a strip or web of flexible material, such as paper, is fed and on which the desired data is to be recorded. Perforations are punched in such strip, hereinafter referred to as the record strip, at predetermined points, such points being determined by the character and meaning of the data recorded. In other words, the perforations are punched in the record strip, in certain predetermined positions, such that for given information or data, the perforations are arranged in a definite and predetermined pattern.

The second part of the apparatus comprises a so-called selector through which the record strip is passed when it is desired to collect any or all of the data recorded upon the record strip. The selector is so constructed that as the record strip is passed therethrough, electric circuits will be controlled by the perforations in the record strip in such a manner as to complete certain predetermined electric circuits for given perforations or arrangements of perforations on the record strip. As it is the perforations in the record strip which permit the electric circuits to be completed, the record strip itself is a non-conductor of electricity.

The third part of the apparatus comprises one or more so-called accumulators or registering devices which are controlled in their operation by the electric circuits completed by the record strip in passing through the selector. A perforation occurring at a given point in the record strip, or a plurality of perforations arranged in a predetermined manner upon the record strip, will complete a predetermined electric circuit or group of circuits when the record strip is passed through the selector, and hence those registering devices which are controlled by these circuits will be actuated to register and accumulate the data represented by the presence of the above-mentioned predetermined perforations in the record strip.

Each of the main parts of the apparatus involves novel features of construction which coöperate in a manner which will hereinafter be apparent to cause the apparatus as a whole to operate in an efficient manner.

The improved apparatus is illustrated in the accompanying drawings, in which:—

Figure 1 is a plan view of a portion of the record strip showing four different patterns, in each of which the perforations are arranged in a peculiar manner significant of the data recorded;

Fig. 1ª is a fragmentary view of a portion of a record strip in which the columns of perforations are unequally spaced for the purpose hereinafter described;

Fig. 2 is a plan view of the punching machine;

Fig. 3 is a vertical longitudinal section of the punching machine taken on the line 3—3 of Fig. 2;

Fig. 4 is a transverse vertical section of the punching machine taken on the line 4—4 of Fig. 2;

Fig. 5 is a broken perspective view of a portion of the escapement mechanism controlling the movement of the carriage in the punching machine;

Fig. 6 is a detail perspective view of the mechanism for controlling the motion of the rewinding roll in the punching machine;

Fig. 7 is a vertical section taken on the line 7—7 of Fig. 2 showing the means by which a so-called master hole may be punched in the record strip without advancing the latter;

Fig. 8 is a broken plan view of a portion of the escapement mechanism shown in Fig. 5 so modified as to cause the perforations to be provided in the record strip in the manner indicated in Fig. 1ª;

Fig. 9 is a more or less diagrammatic plan view of the selector showing the electrical connections between the same and the accumulators or registering devices;

Fig. 10 is a front elevation, partly in section, of the construction shown in Fig. 9;

Fig. 11 is an end elevation of the structure shown in Fig. 9;

Fig. 12 is a broken plan view, partly in section, of a portion of the selector showing the manner in which the surface of the selector over which the record strip passes is constructed;

Fig. 13 is a perspective view, partly in section, also illustrating the manner in which the above-mentioned surface is constructed, that is, the manner in which such surface is formed by assembling a plurality of so-called selector bars;

Fig. 14 is a modified form of selector bar;

Fig. 15 is a broken perspective view of one form of contact brush which serves to complete the electric circuits through the perforations in the record strip;

Fig. 16 is a front elevation, partly in section, of a modified form of contact brush in which the brush as a whole is composed of a plurality of separate contact brushes or springs;

Fig. 17 is a vertical section of one form of plug bar which is employed for establishing electrical connections between the selector and the accumulators or registering devices;

Fig. 18 is a plan view of the plug bar shown in Fig. 17;

Fig. 19 is a vertical section showing a portion of the selector having sockets for receiving the plugs of a plug bar and also showing two plug bars of modified construction, the plugs of one of which bars are capable of being inserted in the sockets of the selector and the plugs of the other bar being capable of being inserted in corresponding sockets provided in the first bar whereby both bars may serve to complete different electric circuits through the same sockets of the selector;

Fig. 20 is a side elevation of one of the accumulator units or registering devices with certain parts broken away to expose underlying mechanism;

Fig. 21 is a front elevation, partly in section, on the line 21—21 of Fig. 20, of two accumulator units showing their relation with respect to each other;

Fig. 22 is an elevation of the mechanism called the carrying mechanism for causing the registering disk of one accumulator unit to rotate the adjacent disk of the adjacent accumulator unit a predetermined distance after the first-named disk has made one complete revolution;

Fig. 23 is an end view, partly in section, of the structure shown in Fig. 22;

Fig. 24 is a section taken on the line 24—24 of Fig. 22;

Fig. 25 is a sectional view taken on the line 25—25 of Fig. 22; and

Fig. 26 is a front elevation of a series of accumulator units showing the manner in which they indicate the accumulated and registered data.

Referring first to Figs. 1, 1ª and 2 to 8, inclusive, showing the record strip and the construction of the punching machine for providing the record strip with perforations, it will be noted that the punching machine comprises a frame 1 in which is mounted a transversely-extending punch-plate 2 for carrying the series of punches. These punches shown at 3 comprise a series of pins, each of which is mounted to slide in a vertical direction in a corresponding opening formed in the punch-plate 2. Each pin 3 which constitutes the punch proper has a conical head portion 4 against the under edge portion of which bears one end of a coil spring 5. The lower end of each coil spring 5 bears upon the punch-plate and thus each pin 3 is urged upwardly toward an operating lever which is mounted directly above the pin and with which it contacts. These levers are shown in Fig. 2 at 7 to 17, inclusive, and each is pivoted at its rear end to an upstanding lug 18 formed on a transversely-extending support 19. As will be noted from Fig. 3, each of the operating levers bears upon the pointed conical head 4 of the corresponding punch, and hence when the forward ends of the levers are depressed, the punches will be depressed. Each of the operating levers is provided at its forward end with a finger key constituting a keyboard, clearly shown in Fig. 2. The finger keys for levers 8 to 17 are shown at 0' and 1' to 9', respectively. The first lever 7 is a special lever, as will hereinafter appear, and its finger key is designated M'. There are, therefore, ten keys and a special key provided for the purpose hereinafter described, but it will be obvious that the number of keys may be modified, as desired.

It will be noted that the lugs 18 to which the key levers are pivoted are disposed in staggered relation. This is for the purpose of making the ratio between the two ends of each lever the same for the eleven levers, that is, that portion of the lever to one side of the punch bears the same ratio to the portion of the lever to the other side of the punch for all of the levers. The pressure exerted by the levers upon the punches is, therefore, the same for all of the levers, providing the pressure exerted upon the finger keys be the same. All of the keys may, therefore, be operated by equal pressures applied thereto at the finger keys.

The record strip denoted by the reference character A is fed from a roll 20 between a pair of relatively thin plates 21 and 22 which direct the record strip under the punch-plate 2 and over a die-plate 23 having an opening 24 lying under each punch. The openings in the die-plate 23 correspond in shape with the cross-sectional shape of the punches, and, therefore, as the punch is forced downwardly and enters the opening in the die-plate, a perforation is punched in the record strip corresponding in shape with the shape of the punch and the die opening. In the present instance, these are circular in shape, and hence circular perforations are punched in the record strip, as will be noted from Figs. 1 and 1ª.

The record strip then passes between a pair of feed rolls 25, 26, and then on to a rewinding roll 27. As the diameter of the rewound strip on the roll 27 constantly changes, the web is preferably not fed through the machine by positively rotating the roll 27, but by positively rotating the feed rolls 25 and 26. This is accomplished by rotating the lower feed roll 26 by means of a longitudinally moving carriage 28 which advances one step each time one or more of the levers 8 to 17 are actuated. The carriage 28 is advanced in this step by step manner by means of the escapement mechanism shown in Fig. 5. The bar shown at 29 in Fig. 5 forms a part of a substantially rectangular-shaped frame, pivoted at 31 and 32 in the main frame of the machine and held in its normal position by means of a coil spring 32' serving to hold the rear part of the rectangular frame 30 against the lower edges of the key levers. The bar 29 shown in Fig. 5 forms an extension of the rear member of the rectangular frame 30, as best shown in Fig. 2. When any one of the levers numbered 8 to 17, inclusive, is depressed, the bar 29 is, therefore, depressed. One longitudinal member 33 of the carriage 28 is provided immediately adjacent the extremity of the bar 29 with a plurality of teeth 34. The extremity of the bar 29 corresponds in shape to the space between the teeth 34, so that when said bar is depressed, the extremity thereof will descend into the space between two of the teeth. When the bar 29 is depressed, it serves to depress a plate 35 against the tension of a coil spring 36. The plate 35 is mounted upon a pin 37 which slides in a socket 38. Interposed between the plate 35 and the lower surface of the bar 29 is a small sliding block 39 which is held against sliding movement longitudinally of the bar 29 by means of a guide 40, but is permitted to slide transversely of said bar by such guide. The extremity of the sliding block 39 also corresponds in shape with the space between two of the teeth, and in the normal position of the parts, such extremity of the block 39 engages between two of the teeth 34, as shown in Fig. 5, and the extremity of the bar 29 lies immediately over such space. The carriage 33 is urged toward the rear of the punching machine by means of a spring 41 which tends to wind upon a transverse shaft 42. The block 39 is, therefore, drawn against a stop 43 which limits the rearward movement of the block. A small coil spring 44 acts upon the block and tends to move it toward the forward end of the plate 35, but as the strength of the spring 41 predominates, the parts are normally held in the position shown in Fig. 5. When the bar 29, however, is depressed, the plate 35 is depressed and the extremity of the block 39 then moves downwardly out of the space which it occupies between the two teeth. The extremity of the bar 29 then assumes the same position which was formerly assumed by the block 39, that is, it occupies the same space between two of the teeth that the block 39 occupied. As the block 39 then lies below the plane of the teeth 34, it is free to be drawn forwardly by means of the spring 44. When the block 39 is moved a sufficient distance to lie in advance of the bar 29, so that it will be free of said bar, the spring 36 forces the plate 35 upwardly causing the extremity of the block 39 to engage between the next two teeth. As the bar 29 is held down during the foregoing operations, the carriage 33 remains locked against movement until the depressed key lever is permitted to rise. The spring 32 acting upon the bar 29 then lifts the latter above the path of the sliding block 39. Hence, the spring 41 acting upon the carriage 33 is free to move the carriage rearwardly until the block 39, which moves rearwardly with the carriage, again comes in contact with the stop 43. The block 39 in moving rearwardly passes under the extremity of the bar 29 and the parts are then again in their normal positions. It will, therefore, be noted that upon the depression and subsequent release of any of the levers numbered 8 to 17, inclusive, the carriage will advance a distance equal to the distance between two of the teeth 34 on the carriage. This motion of the carriage is transmitted to the feed roll 26 through a rack bar 45 formed on the lower part of the carriage 33. The teeth of this rack bar mesh with a gear 46 loosely mounted upon the shaft of the feed roll 26. Positioned adjacent the gear 46 is a ratchet 47 secured to the shaft of the feed roll 26. As the gear 46 is rotated in a counter-clockwise direction by means of the rack bar 45, motion is transmitted from said gear to the ratchet and to the feed roll through the intermediary of a pawl 48 secured to one face of the gear 46 and yieldingly held in engagement with the ratchet teeth by means of a spring 49. The step by step longitudinal movement of the carriage 33, therefore, imparts to the feed roll 26, a step by step rotary motion. When the carriage is returned to its initial position, the ratchet 47 and pawl 48 permit rotation of the gear 46 in a clockwise direction without affecting the position of the feed roll 26. Motion is transmitted to the upper feed roll 25 through the lower feed roll and the web or record strip passing between the two.

At the rear of the carriage, the teeth of the rack bar 45 mesh with the teeth of a gear 50 (Figs. 3 and 6) loosely mounted upon the shaft of the rewinding roll 27. Adjacent the gear 50 is a ratchet 51 also loosely mounted upon the shaft of the feed roll 27. When the gear wheel 50 is rotated in a counter-clockwise direction by means of the rack bar 45, motion is transmitted to the ratchet 51 through the intermediary of a pawl 52 yieldingly held in engagement with the teeth of the ratchet by means of a spring 53. One end of a flat spiral leaf-spring 54, to wit, that end shown at 55, is secured to the ratchet 51, while the other end 56 of such spring is secured to the roll 27. As the ratchet is rotated by the step by step movement of the carriage, it tends to wind the spring 54, but as the rewinding roll 27 is free to rotate sufficiently to keep the record strip taut, the spring tends to unwind, thereby rotating the feed roll and winding the record strip thereupon. When the carriage is returned to its initial position, the gear 50 is rotated in a clockwise direction without affecting the position of the ratchet 51. The latter is held stationary during such return movement of the carriage by means of a second pawl 57 which is pivoted to a bracket 58 secured to a stationary part of the apparatus. This second pawl 57 does not interfere with the rotation of the ratchet during the step by step movement of the carriage, but merely holds the ratchet stationary during the return movement of the carriage. As the pawls 52 and 57 both engage the same ratchet, and as the former has to pass the latter during the step by step movements of the carriage, it is obvious that they must be so constructed as not to interfere with each other. In the present instance, at least one of the pawls is made of less thickness than the thickness of the ratchet, and, therefore, the pawl 52 can pass the pawl 57 without contact therewith.

The special key whose lever is shown at 7 and whose finger key is lettered M' is for the purpose of providing the record strip with a perforation called the "master hole," the purpose of which will hereinafter appear. When this key operates, it is desirable not to have the carriage advance one space, for the reasons hereinafter set forth, and, therefore, its lever 7 is provided with a notch or opening 59 (Fig. 7) directly over the bar 29. Hence, when the lever 7 is depressed, it will have no effect in depressing the bar 29, and, therefore, the carriage will not be advanced. In other respects, the construction of this special key and the punch which it operates is substantially identical with the other keys and punches.

The punching machine above described is designed to produce upon the record strip, patterns of the type shown in Fig. 1, that is, one or more perforations may be punched in any one or more of a series of ten columns numbered 1ª to 10ª in Fig. 1. For this purpose, the punches 3 are disposed in a straight line transversely of the punching machine. The desired number of perforations are provided in the record strip in the first column by simultaneously depressing the proper keys, and when such keys are released, the carriage will advance one space causing the record strip to move a sufficient distance, so that the second time one or more of the keys are depressed, perforations will be punched in the second column of the record strip. The special key M' is for punching the so-called master hole shown at M in each pattern of Fig. 1. This hole is preferably punched in the first column and at no other place in each pattern of the record strip. The purpose of this hole is to control all of the electric circuits when the record strip is passed through the selector, so that each pattern of the record strip must of necessity reach and be in a predetermined position before the selector can operate. In a punching machine for producing a record strip of the type shown in Fig. 1, there are, therefore, eleven keys, including one special key, for punching the master hole M, and ten keys for punching holes or perforations in the positions in each column numbered 0 to 9, inclusive. It is obvious, however, that if it be desired to produce a different type of record strip, the punching machine may be revised accordingly to cause the perforations to be made at the proper points in the record strip. For instance, it may be desirable to eliminate the master hole M and produce the results for which this master hole is intended in some other way. This may be done by spacing the columns of perforations in each pattern of the record strip unequally, as shown in Fig. 1ª. As will later appear, a pattern in which the perforations are punched in this manner must be in proper position before the various electric circuits may be completed in the selector to operate the accumulators or registering devices. In order to cause the columns of perforations in the record strip to be unequally spaced, as shown in Fig. 1ª, the teeth 34 on the carriage 33 may be of successively increasing size, as shown in Fig. 8. It is obvious that in this manner, each movement of the carriage 33 will be slightly greater than the preceding movement, and hence cause the record strip to move a greater distance at each movement of the carriage than at the preceding movement of the carriage.

In order to indicate the position of the record strip in the punching machine to make known the column of the pattern, which is in position to be provided with perforations, a so-called pattern plate 60 (Figs. 2 and 3) is provided which is rigidly secured to the carriage of the machine by means of the brackets 61. A pointer 62 is secured to the frame 1 adjacent to said plate. By placing a written or printed key to the record strip upon the pattern plate 60, the pointer 62 will indicate the position of the record strip in the machine when such printed or written key is properly planned with respect to the record strip. It is obvious that the position of the plate 60 will indicate which column of the record strip is in position to be punched. It will be noted that the gear 46 for driving the feed roll 26 is substantially twice the diameter of the feed roll 26, and, therefore, the carriage will move at each step twice the distance which the record strip is fed. This permits the use of a relatively large key or diagram upon the pattern plate 60, as the columns upon such key or diagram will be spaced twice as far apart as the columns of perforations in the record strip.

As above stated, the details of the punching machine may be modified in accordance with the type of record strip which it is desired to produce. The type of record strip shown in Fig. 1 is the type which is preferred for use in the present apparatus, and, therefore, the punching machine is constructed to produce such type of record strip. As above indicated, each pattern of the record strip comprises ten columns of spaces at which perforations may be provided and each column, except the first, may comprise anywhere from one to ten perforations. The points in these columns at which the perforations may occur are numbered in Fig. 1 as 0 to 9, inclusive. In the first column, the master hole M is punched and, therefore, the first column may comprise eleven perforations.

The manner in which the perforations are provided in the record strip and the number of such perforations will depend upon the data which is to be recorded. The present apparatus is capable of a large number of uses and may record and subsequently register data of many kinds, but for the sake of illustration, let it be assumed that the apparatus is to be used in a store for recording data relating to the various transactions. Each pattern on the record strip would then correspond with one transaction, that is, the perforations in the record strip representing the data for any given transaction will constitute one pattern. There are four of these patterns shown in Fig. 1, in each of which the solid black circular areas represent holes or perforations punched in the record strip. The other positions marked on the record strip are merely to show the location at which other perforations might occur.

The relation between the number and arrangement of the perforations in each pattern will depend upon the system adopted by the users of the apparatus. In other words, it will rest with the users of the apparatus to determine the number and location of the perforations for any certain item to be recorded. For instance, some such system as follows might be adopted. The first four spaces numbered 0, 1, 2 and 3 in column 1ª of each pattern and all of the spaces in the second column, from 0 to 9, inclusive, might be reserved for the date of the transaction. As the first number in any date never exceeds 3, only the first four spaces in the first column are needed for this data. The 0 position may or may not be punched depending upon the system adopted by the users. The last six spaces in the first column numbered 4 to 9, inclusive, may be reserved for the number of the salesman. The salesman may be given the numbers 4 to 9, inclusive, and any combination of such numbers, such, for instance, as 4—5. The perforations punched in column 1 of pattern No. 1, under such conditions, would indicate that the salesman involved is No. 4—5. By using the numbers 4 to 9, inclusive, in combinations with two numbers in each combination, fifteen different combinations can be formed, thus showing that a very small space is needed on the record strip to record the number of a large number of salesmen.

The date indicated by the perforations in pattern No. 1 is the 8th day of the month, as a perforation occurs in the position numbered 8 of column 2. As the 0 position is punched in column 1, the date may be read 0 8. In pattern No. 2, the date indicated by the perforations is the 15th day of the month, as a perforation occurs at position 1 in column 1 and position 5 in column 2.

The third column of each pattern may indicate the particular account involved, that is, the position marked 0 may indicate the cash sales, position No. 1, cash refunds, position No. 2, sales on account, etc. Here again the perforations may be provided in different combinations, thus making it possible to record a large number of different kinds of accounts.

Column 4ᵃ may be reserved for the class of goods, columns 5ᵃ and 6ᵃ for the quantity of material in the transaction, and the remaining columns for the money value of the transaction. It will be noted that two or more columns according to this exemplary system are reserved for numbers containing more than one digit, for instance, perforations provided in the last four columns may indicate the money value of the transaction to be as high as $99.99. The money value of the transaction represented by pattern No. 2 would, according to this system, be $23.57.

Obviously, the above system of punching the record strip may be varied according to the purpose for which the apparatus is used and according to the manner in which the users of the apparatus desire the number and location of the perforations to be related to the data to be recorded. By adopting some such system as that described above, however, it is obvious that practically any amount or variety of information can be recorded without unduly increasing the relative proportions of the record strip shown in the drawing. For instance, by using the positions in combinations of five in three columns, over 16,000,000 combinations are possible.

At any time that it is desired to register or accumulate data recorded upon the record strip, the latter is passed through the selector constituting the second part of the apparatus considered as a whole. From the following description of the selector, it will be seen that the same may cause the accumulators or registering devices to accumulate and indicate in numerical figures, all of the data recorded upon the record strip or certain parts thereof, depending upon the setting of the selector. Thus, if at any time it is desired to know all of the data recorded upon the record strip, the same may be passed through the selector, and if the latter is properly set to "take off" all of the data from the record strip, the accumulators will indicate all of such data. If it be desired to know only the total quantity of material sold, the selector may be so set as to take off this data from the record strip and none other. Furthermore, any combinations of data may be taken off the record strip if the selector be properly set for this purpose, for instance, it may not only be desired to know the total quantity of material sold during the given period, but it may also be desired to know the money value of the transactions involved, and these two combinations of data or any other combinations may be taken from the record strip and indicated by the registering devices by merely setting the selector in a predetermined manner, as will hereinafter appear, and passing the record strip through the selector until all of those patterns have passed through the selector which represent the total number of transactions for which the data is desired.

The selector for "taking off" the data represented by the perforations in the record strip is illustrated in Figs. 9 to 19, inclusive, and will now be described.

In its preferred form, the selector comprises a framework, denoted as a whole by the reference character 63, (Fig. 10), which supports a surface 64 over which the record strip is passed. At one side of the surface 64, the framework 63 supports a rotatable spool 65 from which the record strip may be unwound and wound upon a second spool 66 disposed at the opposite side of the surface 64. The spool 66 upon which the record strip is wound may be rotated by hand, or in any other suitable manner.

According to one form of the invention, the surface 64 is of electric non-conducting material, but is provided with a plurality of separate sections of conducting material corresponding in number and location with the various positions of the record strip which are capable of being punched. Each of these conducting sections is connected by an electric conductor to a corresponding socket on a so-called terminal board, so that there is provided one of such sockets for each conducting section on the surface 64. The sockets are capable of being connected, by means of conductors having plugs insertible in the sockets, to the accumulators or registering devices, as will hereinafter appear. Brushes are supported over the conducting sections on the surface 64 in such a way that current supplied to these brushes is conducted through those conducting sections which register with perforations in the record strip, and thence through the terminal board and conductors to the accumulators. However, the electrical connections and the number and type of brushes employed will determine which sections on the surface 64 the electric current will pass through, and thus current need not pass through all of the conducting sections with which perforations in the record strip register. This will be made more clear as the specification proceeds.

Preferably the surface 64 is made up of a plurality of selector bars, one end of each of which is relatively wide, as shown at 67 in Fig. 12, and the other end of which is relatively narrow, as shown at 68. The narrow end 68 is preferably one-half the width of the relatively wide end 67. These bars when assembled in the manner now to be described produce a surface or table over which the record strip passes and at either side thereof, a surface or table which constitutes a part of the above-mentioned terminal board. Thus the terminal board instead of being located as a whole to one side of the surface 64 is divided and half of the terminal board lies on one side of said surface and half on the other side. Two upper parallel beams 69 and 70 of the framework 63 have the cross-sectional shape shown in Fig. 13, that is, their cross-sectional shape is somewhat analogous to the cross-sectional shape of an eye-beam. Each of such beams 69 and 70 have openings 71 cut in their lower portion, which openings extend completely through the lower horizontal portion 72 of the beams and through the vertical web portion 73 thereof, but do not extend through the upper head portion 74. As will be clear from Fig. 13, these openings are spaced apart a distance equal to the width of the narrow part 68 of the selector bars and each opening is equal in width to the width of such narrow portion of the selector bars. The selector bars are assembled by inserting the narrow end 68 of the first selector bar $s'$ in the first opening 71 and sliding the same longitudinally until the shoulders 75 (see Figs. 12 and 13) rest upon the two ledges 76 (Fig. 13) adjacent the opening in which the bar is inserted. The openings 71 are so formed in the two beams 69 and 70 that the ledges 76 of one beam will lie directly opposite the openings of the other beam. Therefore, when the first selector bar assumes its final position, the extremity of the narrow portion of the bar will rest upon a ledge which is directly opposite the opening in which the selector bar is inserted. This ledge is shown at 76' in Fig. 12. The second selector bar $s^2$ is inserted from the other side of the surface 64, that is, its small end is inserted through an opening in the other beam until its shoulders 75 rest upon the ledges adjacent such opening and until the extremity of its narrow portion rests upon the ledge $76^2$ at the inner side of the other beam (Fig. 12). The third selector bar $s^3$ is inserted from the same side as the selector bar $s'$. One of its shoulders 75 in the final position of the selector bar will occupy part of the ledge occupied by the adjacent shoulder of the adjacent selector bar $s'$, as clearly shown in Fig. 12 and the adjacent edges of the wide portions 67 of these two bars will be contiguous. Likewise the adjacent edges of the two narrow portions 68 of the two bars $s'$ and $s^2$ will be contiguous. The other shoulder 75 of the bar $s^3$ will rest upon part of the next ledge and the extremity of the small end of the selector bar will rest upon a ledge $76^3$ opposite the opening in which the selector bar $s^3$ is inserted. By inserting the bars in this manner first from one side of the surface 64, and then the other, the central surface 64 is formed by the closely adjacent narrow portions 68 of the selector bars, and at either side of such surface, a surface or table is formed of the closely adjacent wide portions 67 of the selector bars. The outer ends of the selector bars $s'$, $s^3$, $s^5$, $s^7$ and $s^9$ are supported on a ledge 77 (Fig. 10) formed in an upper beam 78 at one side of the framework 63 and the outer extremities of the selector bars $s^2$, $s^4$, $s^6$, $s^8$ and $s^{10}$ are supported on a similar ledge not shown in the drawing, but formed in a beam at the other side of the framework corresponding to the beam 78.

As best shown in Fig. 9, the narrow portions 68 of the selector bars are provided with a series of electric conducting sections corresponding in number and position to the positions of one column on the record strip. For instance, the first selector bar $s'$ is provided with eleven conducting sections corresponding to the eleven positions of the first column of any pattern on the record strip at which perforations might occur. Ten of these conducting sections 0″ to 9″ correspond to positions 0 to 9 of the record strip and the other conducting section M″ corresponds with the position M where the "master hole" occurs. The second selector bar $s^2$ is provided with only ten conducting sections 0″ to 9″ corresponding to the positions 0 to 9 in the second column of the record strip pattern. Likewise all of the other selector bars are provided with ten conducting sections corresponding in position to the positions at which perforations might occur in the record strip. It will be understood that the selector bars are composed of material which will not conduct electricity, but that the conducting sections will conduct electricity and for this purpose they may be made of copper or any other suitable conducting material. There, therefore, occurs on the surface 64, a conducting section for each position of a pattern on the record strip at which a perforation might occur, so that if the record strip is in proper position, and if all of the positions in a pattern of the record strip were punched, the perforations would register with the conducting sections, and there would be one conducting section for each perforation.

The conducting sections may be made of any suitable material which will conduct electricity, but they are preferably made of copper and pass completely through the selector bars, as shown in Fig. 10, so that they may be connected by wires below the selector bars and leading to the terminal boards.

The wide portion of each selector bar has a series of sockets corresponding in number with the conducting sections on the narrow part of the selector bar. For instance, the first selector bar $s'$ has eleven sockets, the first of which $M'''$ is electrically connected by means of a wire or conductor to the conducting section $M''$. The second socket $0'''$ is electrically connected to the second conducting section $0''$ of the same selector bar, as clearly shown in Fig. 10. The third socket $1'''$ is connected to the third conducting section $1''$ of the same selector bar, and likewise all of the other sockets of the selector bar $s'$ are electrically connected by means of conductors to the corresponding conducting sections at the narrow end of the selector bar. Each of the other selector bars has only ten sockets corresponding with the ten conducting sections at the narrow end of the bar. On the second selector bar $s^2$, the sockets $0'''$ to $9'''$ are electrically connected by means of conductors to the corresponding conducting sections on the narrow end of the bar. Likewise, the sockets in each of the other bars are electrically connected by means of conductors to the conducting sections on the narrow ends of such bars. It will, therefore, be seen that each conducting bar comprising the wide end with its sockets and the narrow end with its conducting sections is self-contained and that each of the bars, together with the conductors at its under side which connect the sockets with the conducting sections, may be removed and replaced as a unit. The conductors at the under side of each selector bar may be bound together so that they will occupy a small space and not exceed in width, the width of the narrow end of the selector bar.

A contact brush either of the form shown at 79 in Fig. 15, or 80 in Fig. 16, is adapted to be supported on the beams 69 and 70 over any one of the columns of conducting sections on the surface 64. The brush 79 shown in Fig. 15 has a plurality of closely positioned depending wires 81 of sufficient length to make contact with the conducting sections on the surface 64 when the brush is supported on the beams 69 and 70. These wires 81 are mounted in a bar 82 capable of reaching from the beam 69 to the beam 70. The brush is positioned by resting the extremities of the bar 82 on top of the beams 69 and 70, as shown in Fig. 10, and may be held against accidental displacement by means of depending pins 83 at the extremity of the bar 82 which are adapted to engage in corresponding openings formed in the top of the beams 69 and 70. At each end of the bar 82, there is a plug 84 of electric conducting material, and these plugs are electrically connected, by means of a conductor which does not show in the drawing, to all of the wires 81 of the brush. Therefore, if either of the plugs 84 be connected with a source of electric current, the current will flow through the wires 81 of the brush and through those conducting sections on the surface 64 which register with a perforation in the record strip, provided the electrical connections between the terminal board and the accumulators are such as to complete the circuits through these conducting sections. As will later appear, it is sometimes necessary to use a brush of the form shown in Fig. 16 in which the bar 82 carries a plurality of spring fingers 85 which are insulated from each other by means of the insulating bushings 86. The contact springs 85 are somewhat stiffer than the wires 81 of the brush 79 and are preferably curved at their lower ends, as shown at 87' in Fig. 11, so as not to injure the record strip. The upper end of each of the spring contact fingers 85 extends above the bar 82, and serves as a plug to which a socket on the end of a conductor may be connected. It may sometimes be necessary to use both types of brushes at the same time, as will later appear. Both types of brushes are shown in Figs. 9 and 10, as the "setting" of the selector illustrated in these figures requires the use of both types of brushes.

In addition to the sockets of the terminal board that are carried by the selector bars, there are provided a number of additional or extra sockets shown at 87 to 92, inclusive. These sockets are provided in a stationary part of the framework. Two of these sockets, for instance, those shown at 87 and 88, may be permanently connected to a source of electric current, such as the battery B, and others of said sockets, such as those shown at 90, 91 and 92, may be connected to the accumulators or registering devices by means of the conductors 93, 94 and 95, respectively. As will hereinafter appear, these conductors are connected to those accumulator units which it is desired to actuate by the passage of current through certain of the conducting sections on the surface 64. The sockets 87 to 92, inclusive, may be connected to the other sockets of the terminal board by means of conductors having at their extremities, suitable plugs for insertion in the sockets. Likewise any of the sockets of the terminal board may be connected to the brushes positioned over the surface 64 by means of conductors having plugs at one end for insertion in the sockets, and sockets at the other end for connection with the plugs 84 on the brushes 79 or the plug-like extremities of the spring contacts 85 of the brushes 80. Furthermore, the sockets of the terminal board may be connected with the accumulator units, but the conductors for this purpose are preferably provided with special plug connectors shown in detail in Figs. 17, 18 and 19. The accumulator units will be hereinafter described in detail, but it should be here noted that each accumulator unit has nine electro-magnets, for the purpose hereinafter described. When any one or more of the accumulator units is being used for registering and accumulating data, each of the magnets of such accumulator or accumulators is connected by means of a conductor to one of the sockets of one series on the terminal board. The nine conductors leading to one accumulator unit for the nine magnets therein are preferably bound together to form a single cable. One of these cables leading to the accumulator unit $a$ is shown at 96 and is provided at its end with a plug bar 97 having a series of spaced plugs 98 adapted to slip into the sockets of any series of sockets on the terminal board. For this purpose, the plugs are spaced the same distance apart as the sockets. The length of the plug bars 97 may vary and the number of plugs which they carry may vary to suit requirements, but preferably they are provided with nine plugs for insertion in the sockets of any series numbered $1'''$ to $9'''$. The plugs 98 are insulated from each other and each is connected with one of the nine conductors making up the cable 96. In this way, current may be conducted from any one of the conducting sections on the surface 64 through the corresponding socket of the terminal board, and then through that conductor of the cable which is connected to such socket to the proper magnet in the accumulator unit. As will be noted from Fig. 19, the plug bar 97, in addition to having the plugs 98, has at its upper side, a series of sockets 99 in which the plugs may be inserted of a second plug bar identical with that just described. This second plug bar 97' is shown in Fig. 19 immediately above the plug bar 97 and in position to have its plugs inserted in the sockets of said plug bar 97. Another cable 100 runs from the second plug bar 97' to the accumulator unit $e$. This cable is also composed of nine conductors, which at one end are connected to the nine magnets in the accumulator unit $e$ and at the other end to the nine plugs of the plug bar. The first plug bar 97 is shown in the drawings as being applied to the series of sockets in the selector bar $s^{10}$ and the second plug bar 97' is applied to the series of sockets in the first plug bar 97. As will later appear, these plug bars are applied to that series of sockets in the terminal board through which it is known that current will pass to the accumulator units. Two other plug bars identical with those just described are shown at 101 and 101', the bar 101 being applied to the series of sockets in the selector bar $s^9$ and bar 101' being applied to the series of sockets in bar 101. A cable 102 runs from the plug bar 101 to accumulator unit $b$ and a similar cable 103 runs from plug bar 101' to accumulator unit $f$. It will be understood that these cables are made up of conductors connected with the series of plugs and with the magnets in the accumulator units in the same manner as described above in connection with the plug bars 97 and 97'. It will also be understood that these plug bars may be applied to any series of sockets in the terminal board depending upon the type of data to be taken off the record strip. Figs. 9 and 10 show the parts of the selector arranged for only one setting out of a large number of possible settings. In Figs. 9 and 10, the setting of the selector or, in other words, the arrangements of the brushes and plug bars and various electrical connections is such that only certain data will be taken off the record strip, as will hereinafter appear.

The other electric conductors shown in Figs. 9 and 10, but not hereinbefore specifically described, will be referred to later when the specific setting of the selector is referred to and described.

It is obvious that it may often be desirable to have only one plug bar positioned over a series of sockets in the terminal board, in which case a plug bar of the type shown in Figs. 17 and 18 may be employed in which the plugs 98' are substantially like the plugs 98 of the plug bars hereinbefore described, but no sockets are provided at the top of the plug bar in which the plugs of another plug bar may be inserted.

In Fig. 14, there is illustrated a modified form of selector bar in which the above-described individual conducting sections $0''$ to $9''$ are replaced by a single strip of conducting material shown at 104. This conducting strip may be electrically connected by means of a conductor 105 to a single socket 106 positioned in the wide part 67 of the selector bar which assists in making up the terminal board. As will hereinafter appear, this type of selector bar is employed when it is desired to actuate one or more of the registering devices when perforations occur in a predetermined column of the record strip, regardless of the exact location of the perforations in the column. In other words, a perforation occurring at any position in the column will permit an electric circuit to be completed through the conducting strip 104.

The registering devices or so-called accumulator units are preferably constructed as shown in Figs. 20 to 26, inclusive. Referring first to Figs. 20 and 21, it will be noted that each of such units comprises a casing 107 which is substantially rectangular in shape and which is open at one side. The peripheral edge portion of the open side of the casing is slightly flared or enlarged, as shown at 108, so that such flared portion of each casing may slip part way over the closed side of the casing of an adjacent unit when the units are assembled or closely positioned, as shown in Fig. 21. In this way, the rear wall 109 of one unit constitutes the front wall of the adjacent unit. The said wall 109 of each unit is provided with a boss 110 forming a bearing for the journal 111 of a toothed disk 112. The extremity 113 of the shaft of the disk 112 is substantially square in cross section, as best shown in Fig. 20, and is adapted to be received by a correspondingly-shaped opening 114 formed in the journal 111 of the toothed disk of the adjacent unit. In this way, all of the toothed disks of all of the units are positively connected and rotate in unison. They may be rotated in any suitable manner, and when so rotated, serve to transmit rotation of the counting disks through the intermediary of the mechanism presently to be described. In Fig. 21, two accumulator units or registering devices are shown, the first of which, denoted generally by the reference character *a*, will be hereinafter referred to as the "units" accumulator and that designated by the reference character *b* will be hereinafter referred to as the "tens" accumulator. The invention contemplates the use of as many of these accumulator units as may be necessary, but for the sake of illustration, only the "units" and "tens" accumulators or registering devices will be referred to. The counting disk for the accumulator unit *a* is shown at 115, and that for the unit *b* is shown at 116. Each of these disks is loosely mounted upon a hub-like portion 117 formed on the shaft of the toothed disk 112.

Associated with the periphery of each of the counting disks is a series of numbers from 0 to 9, which numbers are capable of being brought into position to be viewed through openings 118 formed in the front of the accumulator units. There is one of these openings for each accumulator unit, as best shown in Figs. 21 and 26 into registry with which the numbers on the corresponding disk may be successively brought.

Mounted upon the face of the counting disk in each accumulator unit is a series of radially-disposed sliding bars 119. From Figs. 20 and 21, it will be noted that these bars are mounted upon the face of the disk adjacent the corresponding toothed disk. There are ten of these sliding bars, there being one of the same for each of ten teeth provided on the toothed disk 112. As the counting disk shown in Fig. 20 is partly broken away to expose underlying mechanism, only seven of these sliding bars appear in this figure, as the remaining three bars are carried by that portion of the disk which is broken away. Each of the sliding bars is slidably mounted upon the disk by means of two straps 120 in which the bars are capable of a limited sliding movement. The movement of each bar is limited by means of a pin 121 secured to the bar, which pin by contacting with either of the straps 120 limits both the inward and outward movement of each of the bars. The movement of each bar is such that in its extreme inward position, the inner extremity of the bar reaches substantially to the bottom of one of the teeth on the disk 112 and in its outward position, the inner extremity of the bar will be clear of the teeth of the disk 112. As will be clear from Fig. 20, the sliding bars 119 are so disposed that when any one of the same is forced inwardly, it will be engaged by one of the teeth of the disk 112, thus causing the counting disk to rotate. In order to yieldingly hold the sliding bars 119 against accidental displacement in their extreme positions, a small leaf-spring 122 is secured to each of the innermost straps. Only one of these springs is shown in Fig. 20, and it will be understood that the springs for the other sliding bars are analogous in construction. The extremity of the spring 122 is bent inwardly and is capable of lightly engaging in either one or the other of two small recesses 123, depending upon whether the sliding bar is in its inward or outward position.

Slidably mounted upon the rear wall 109 of each accumulator unit is a series of plungers numbered 124' to 124⁹. There are nine of these plungers mounted in a circular series about the sliding bars 119. They are substantially 36° apart, except in the case of plungers 124⁹ and 124', which are 72° apart. In other words, there is no plunger located at the point where the tenth plunger would be located if there were one of these plungers provided for each of the sliding bars 119. Each of the plungers just described is mounted in a strap 125 and is yieldingly urged inwardly by means of a coil spring 126 reacting against the strap 125 and a shoe 127 provided on the plunger. The plungers are normally prevented from moving inwardly by means of a shoulder 128 provided on each shoe 127, which is normally engaged by a corresponding shoulder 129 formed on a catch lever 130. There is, therefore, one of these catch levers 130 for each of the nine sliding plungers and each is actuated by an electro-magnet positioned in the casing of the accumulator unit. There are, therefore, nine electro-magnets which constitute the magnets above referred to that are controlled by the passage of the record strip through the selector. The magnet which controls the catch lever for the sliding plunger 124' is shown at 131', the magnet for the catch lever of the plunger 124² is shown at 131², and so on, the last magnet for the catch lever of plunger 124⁹ being numbered 139⁹. The electro-magnets are, therefore, numbered 131' to 131⁹. When these magnets are energized, they attract corresponding armatures shown at 132' to 132⁹. The armatures are pivotally connected to levers 133' to 133⁹ which themselves are pivotally mounted on the rear wall 109 of the accumulator unit, as shown in Fig. 20. The levers 133' to 133⁹ are operatively connected with the corresponding catch levers 130, so that upon actuation of any electro-magnet, the corresponding catch lever will be actuated to disengage the shoulders 128 and 129 and permit the corresponding plunger to move to its inward position. The inward movement of each plunger is limited by a head portion 134 formed upon the plunger which contacts with the strip 125. When any one of the plungers is moved in this manner to its inward position, its shoe 127 engages the extremity of the underlying sliding bar 119 and forces this bar inwardly until its inner extremity is in position to be engaged by one of the teeth of the disk 112. A small spring 135 acts upon each of the levers 133' to 133⁹ in order to return the armature to its normal position upon deënergization of the magnet. These springs are provided to prevent residual magnetism in the magnets from retaining the armatures in their attracted positions. After release of any one of the sliding plungers 124' to 124⁹, such plunger stays in its inward position until it is forced back by a cam-like portion formed upon the counting disk. As will be clear from Fig. 20, there is one of these cam-like portions formed on the counting disk between each two sliding bars 119. These cam-like portions, as best shown in Fig. 23, comprise a struck-up portion 136, the outer cam-like edge 137 of each of which is capable of passing directly under the shoes 127. After any sliding plunger moves to its inward position and the counting disk starts to rotate, the oncoming struck-up portion 136 serves as a cam and engages with the shoe 127 of such plunger to move the plunger outwardly and restore the same to its initial position. The shoulders 128 and 129 on the shoe and catch lever respectively then reëngage to hold the plunger in its normal position. It will, therefore, be understood that the cams or struck-up portions 136 are so located on the counting disk that when the plungers 124' and 124⁹ are held in their outward position, such cams will have no effect upon the position of the shoes 127, although it is desirable to cause the cam-like edge 137 of such struck-up portions to slide lightly against the shoes to produce a braking effect for the counting disk to arrest its motion, as will hereinafter appear. It will be understood that these struck-up portions 136 project from the counting disk toward the rear wall 109 of the accumulator unit and toward the sliding plungers which are mounted on such rear wall.

Associated with each casing of the accumulator units is a series of sockets numbered 138' to 138⁹. Each of these sockets is connected by means of a conductor to one of the magnets. In the present instance, only three of these conductors are shown, to wit, those which connect the socket 138⁹ with magnet 131⁹, socket 138⁴ to magnet 131⁴, and socket 138⁶ to magnet 131⁶. The other conductors are omitted as they would only serve to confuse the drawing. All of the magnets are connected to a common return conductor 139 which leads to the selector. The sockets 138' to 138⁹ are spaced apart the same distance as the sockets on the terminal board, so that the plug bar of the type shown in Figs. 17 and 18 may be employed for coöperation with such sockets 138' to 138⁹. It is, therefore, evident that separate electric circuits may be completed from the selector through the several electro-magnets 131' to 131⁹. As above stated, the accumulator units are closely positioned, as shown in Fig. 21, and when so positioned, means is provided for causing the counting disk of one unit to coöperate with the counting disk of the second unit, so that when one disk, for instance, the "units" disk, approaches one complete revolution, it will cause a partial rotation of the second disk, or the "tens" disk. The mechanism for accomplishing this is herein referred to as the "carrying mechanism", and is shown in detail in Figs. 22 to 25, inclusive. In order to properly hold the accumulator units in association with each other and permit the "carrying mechanism" to properly operate, the units are preferably mounted upon a common support shown at 140 to which the units may be rigidly secured by means of bolts or other fastening devices 141 (Fig. 21).

This "carrying mechanism" comprises for each accumulator unit, a sliding rod 142 mounted upon the rear wall 109 of the accumulator. There is, therefore, one of these sliding rods for each accumulator, as shown in Fig. 21, and each is slidably held upon the rear wall 109 of the corresponding accumulator by means of a pair of brackets 143 and 144. As will be noted from Fig. 20, this sliding rod is positioned substantially midway between the two plungers 124⁹ and 124'. The sliding rod 142 is normally held in a retracted position and is released by the counting disk in the adjacent accumulator when the latter approaches one complete revolution. When thus released, the sliding rod 142 moves one of the sliding bars 119 of the same accumulator inwardly, thus setting the counting disk of that accumulator in rotation. This counting disk is arrested in its motion, after it has moved one space in order to bring the next higher number into registry with the opening 118. For instance, if the "units" counting disk 115 makes one revolution, the sliding rod 142 of the adjacent "tens" accumulator is released and moves an adjacent sliding bar 119 inwardly, thus causing the "tens" disk 116 to rotate one space. This brief description of the operation of the "carrying mechanism" is given for the purpose of making the following detailed description of its construction and operation of each of its parts clear and obvious.

The detailed construction of the "carrying mechanism" for one accumulator unit only will be described, as the "carrying mechanism" for all of the units is constructed in a similar manner. As will be noted from Figs. 22 and 25, the sliding rod 142 is yieldingly urged toward the axis of the counting disk by means of a coil spring 145 which acts upon a collar 146 secured to the rod 142 and reacts at its other end against the bracket 144. Adjacent the collar 146 is positioned a sleeve 147 which is slidably mounted upon the rod 142, but is not capable of rotating thereon. This sleeve is yieldingly urged toward the collar 146 by means of a second coil spring 148 which reacts against the bracket 143. The strength of the spring 145 predominates and the tendency is for the rod 142 to move inwardly toward the axis of the counting disk, but this is normally prevented by two pivotally-mounted retaining segments. One of these is shown at 149 which normally engages with the inner side of a lug 150 carried by the sliding bar 142. It will be noted from Fig. 24 that this retaining segment 149 has a projecting portion 151 which extends rearwardy through a slot in the rear wall 109 of the accumulator unit. It also has a projecting portion 152 which is capable of moving into and out of operative relation with the lug 150. The segment 151 is normally retained in its operative position shown in Fig. 24 by means of a leaf-spring 153. The second retaining segment shown at 154 also has a portion 155 which projects through a second slot or opening in the rear wall 109 and has a projection 156 capable of moving into and out of operative relation with a lug 157 carried by the sleeve 147. The retaining segment 154 differs from the retaining segment 149, in that it has an elongated portion 158 projecting away from the rear wall 109 and toward the inner side of the counting disk. A leaf-spring 159 acting upon the inner side of this elongated portion 158 serves to yieldingly retain the segment in the position shown in Fig. 23. It is now obvious that if both of the retaining segments just described be actuated by causing the counting disk of the accumulator to act upon those portions of the segments which extend through the rear wall 109, the sliding rod 142 will be released and will move inwardly. The means for accomplishing this takes the form of two projections 160 and 161 mounted upon the outer face of the counting disk (see particularly Figs. 20 and 21). These projections are so mounted on each counting that when the 0 of such disk is visible, they will occupy the position shown in Fig. 20. Therefore, just before such disk completes a full revolution, these projections will act upon the retaining segments 149 and 154 of the adjacent accumulator to release the sliding rod 142 of such adjacent accumulator unit. For instance, if the 0 of the "units" counting disk is visible through the opening 118, the projections 160 and 161 of this disk will occupy the position shown in Fig. 20 just below the sliding rod 142. When this "units" disk has nearly completed its full revolution and just before the 0 again registers with the opening 118, such projections will act upon the portions of the segments 149 and 154 which project from the "tens" accumulator, thus releasing the sliding rod 142 of the "tens" accumulator and moving one of the sliding bars 119 which lies adjacent such sliding rod inwardly to cause the "tens" disk to rotate. As will be noted from Figs. 22 and 25, in each stationary position of the counting disk one of the sliding bars 119 lies immediately adjacent and parallel to the sliding rod 142, and when the rod 142 is released as above described, such sliding bar 119 is moved inwardly through the intermediary of a projecting finger 162 at the end of such sliding rod (see Fig. 25). When the tens disk is set in operation as just described, it will rotate until the pin 121 on the bar 119, which has been moved inwardly, engages with a cam 163 projecting from the rear wall 109 of the accumulator. The position of this cam is shown in Fig. 20, from which it will be noted that the tens disk, or any disk which is set in operation after a full revolution of the preceding disk, will move but one space.

The inward movement of the sliding rod 142 is limited by reason of the fact that the lug 150 contacts with the end bracket 143 in which the sliding rod 142 is mounted. When the retaining segments 149 and 154 are actuated in the manner above described and the sliding rod 142 moves inwardly, the projecting portion 152 of the segment 149 rests on the top edge of the lug 150. The projecting portion 156 of the segment 154 in the inward position of the sliding rod, 142, engages with the outer side of the projection 157 on the sleeve 147. After the segments have been tripped as above described to permit the sliding rod 142 to move inwardly, the adjacent oncoming struck-up portion 136 of the corresponding counting disk will engage with the projecting finger 162 of the rod 142 and will move the sliding rod 142 back to its normal position. The projecting portion 152 of the segment 149 will then reengage the inner side of the lug 150 and again hold the sliding rod in its normal position. As the segment 154 engages with the outer side of the projection 157, the sleeve 147 is prevented from moving with the rod 142 when the latter is restored to its normal position. However, when the pin 121 on the sliding bar 119 which has been moved inwardly by the rod 142 passes the elongated portion 158 of the segment 154, it acts upon this elongated portion to swing the segment 154 and thereby release the sleeve 147. The latter is then returned to its normal position against the collar 146 by the coil spring 148. The purpose of causing this temporary retaining action of the sleeve 147 will hereinafter appear.

When numbers are to be registered which contain both units and tens, it is obvious that both units and tens counting disks will be simultaneously set in motion.

The means has been described by which the tens disk is caused to rotate one space after the units disk makes one revolution, but no mention has been made of how the units disk, or any other disk which is set in motion by the actuation of the electro-magnets, is arrested in its motion. As heretofore explained, any counting disk is set in operation by the energization of one of the magnets $131'$ to $131^9$, and, therefore, one of the sliding bars 119 will be depressed by the corresponding plunger until one of the teeth of the rotating toothed disk 112 engages with the extremity of such sliding bar. The counting disk will then rotate until the depressed sliding bar 119 reaches the sliding rod 142. The sleeve 147 of this sliding rod is provided with a cam-like portion 164 with which the pin 121 of the depressed sliding bar contacts and the depressed sliding bar is thus moved outwardly and restored to its normal position. The counting disk carrying such sliding bar is then arrested in its motion. If the 0 were in reading position before actuation of the disk and the magnet $131^5$, for instance, were actuated, the plunger $124^5$ would depress the sliding bar 119 associated therewith and the counting disk carrying this bar would rotate until such sliding bar were restored to its normal position by means of the cam-like portion 164 on the sleeve 147. The number 5 would then be in reading position. In a similar manner if the magnet $131^8$ were energized, the number 8 would come to reading position provided the 0 were in reading position before the disk started to rotate. If magnet $131^5$ were first energized and then magnet $131^8$, first the 5 would come into reading position, but upon energization of magnet $131^8$, the tens disk would come into operation, as the units disk will make more than one complete revolution from its initial position, and thus cause the tens disk to bring 1 into reading position. When the units disk comes to rest, the 3 will be visible because the numbers 8 and 5 have been added showing on the two accumulators, a total of 13.

If numbers containing both tens and units are to be registered, it is obvious that the units disk, and also the tens disk, will be simultaneously set in operation by energization of the proper magnet in its accumulator. If the tens disk comes to rest before the projections 160 and 161 of the units disk reach the segments 149 and 154 of the tens accumulator, the operation of the "carrying mechanism" in causing the tens disk to rotate one space will be the same as that above described. If, however, the tens disk is still rotating when the units disk comes into position to actuate the segments 149 and 154 of the tens accumulator, the operation is slightly different. In the latter case when the sliding rod 142 of the tens accumulator is released by the projections 160 and 161 on the units disk, there will be no sliding bar 119 of the tens disk in position to be moved inwardly by the finger 162 of such sliding rod 142. This is because both disks are rotating in unison and the sliding bars 119 of one disk are in alinement with those of the other disk. The sliding rod 142, however, will be released by the units disk the same as before, and it is then immediately retracted by means of the oncoming struck-up portion 136 of the tens disk. As hereinbefore described, however, the sleeve 147 is held in its innermost position by reason of the fact that the segment 154 engages with the outer side of the projection 157. In this position of the sleeve 147, the cam-like portion 164 thereon will not lie in the path of the pin on that sliding bar 119 which is transmitting motion to the tens disk, and, therefore, this sliding bar will pass the sleeve 147 without being restored to its normal position by the cam-like portion 164. However, the elongated portion 158 of the segment 154 lies in the path of the pin on this depressed sliding bar 119 and when the pin passes this elongated portion, the segment 154 will be actuated to release the sleeve 147 and allow it to return to its normal position. The depressed sliding bar of the tens disk which thus passes the sleeve 147 without being acted upon, therefore moves on until the cam 163 is reached, and then such depressed sliding bar is restored to its normal position. The "tens" will, therefore, be "carried" in the same manner as if the tens disk were not rotating when the units disk makes its complete revolution. It will, therefore, be seen that the temporary holding of the sleeve 147 in its inward position is for the purpose of preventing restoration of the sliding bar which is transmitting motion to the tens disk to its normal position before such sliding bar reaches the cam 163.

It will be understood, of course, that the units disk need not make a complete revolution each time it is actuated in order to actuate the tens disk. The complete revolution referred to above starts, of course, with the 0 position of the disk and successive partial rotations of the disk will actuate the tens disk after the units disk has again reached the 0 position, or, in other words, made one revolution, regardless of whether this complete revolution is caused by a continuous rotation of the disk or successive rotations thereof.

Although the "units" and "tens" disks only have been above referred to, it is obvious that the operations of carrying the "hundreds" is the same as carrying the "tens."

The operation of the entire apparatus will now be described, using specific examples to make the operation of each part of the apparatus perfectly clear.

The record strip is perforated in the punching machine in accordance with the data to be recorded, it being understood that the person recording the data is familiar with some predetermined system to be followed in punching the strip, so that the number and position of the perforations will be significant of the data which it is desired to record. Each transaction will be represented by one pattern of the record strip, for instance, the perforations making up pattern No. 1 of the record strip will represent data relating to one transaction only, while the perforations making up pattern No. 2 will represent the data of a different transaction. If a record strip of the type shown in Fig. 1 is to be employed, each pattern is provided with the master hole M, but if a record strip of the type shown in Fig. 1ª is employed, the master hole M may be omitted as the unequal spacing of the columns of perforations produces the same result as the master hole M, that is, if the conducting sections of the selector be arranged in unequally spaced columns, it is obvious that the perforations in the record strip through which current passes must register with the corresponding conducting sections of the selector before current can pass through any of the perforations, provided the current passes through the perforations in "series."

One system which may be adopted for recording the data has been described above, but it will be understood that the system employed will depend upon the type of data to be recorded and the purpose for which the entire apparatus is employed. The users of the apparatus will adopt their own system and, therefore, the system described above is only exemplary. The patterns punched on the record strip may be much more complicated than those shown in the drawings and indicated in pattern No. 1 and pattern No. 2, or they may be much simpler. Pattern No. 3 and pattern No. 4 have been made relatively simple so that these may be used in explaining the operation of the selector without unduly complicating the explanation. It will be understood, however, that no matter how complex the pattern may be, the selector is capable of being properly set to take off all or some of the recorded data.

Suppose it be desired to take off data from the record strip represented by perforations occurring in the last two columns of each pattern. It is immaterial, so far as the present description is concerned, what data these perforations might represent, but it will be understood that perforations occurring in these columns have special significance depending upon the adopted system. The perforations in the last two columns of pattern No. 3, representing the number 34, and the perforations in the last two columns of pattern No. 4, representing the number 76, may refer to the same or different kinds of data. Let it be assumed that the latter condition is true for then a better idea may be obtained of the possibilities of the apparatus. The kind of data to which the perforations in pattern No. 3 refer will depend upon an extra index perforation punched at a particular point in the pattern, such, for instance, as position 1 in column 3$_a$. Likewise pattern No. 4 is provided with an index perforation at position 0 in column 6$_a$ to indicate the type of data represented by the perforations punched in the last two columns of this pattern. As will soon appear, these index perforations cause the perforations in the last two columns of the two patterns to actuate different sets of registering units, thereby keeping the data separate and distinct. Furthermore, as current is caused to pass through these index perforations every time it passes through the corresponding perforations in the last two columns, such index perforations may be employed to actuate a certain registering unit or group of registering units, to cause the same to indicate the number of times each index perforation occurs, and hence the total number of items represented by the index perforations. Any perforation or group of perforations may thus have any other particular perforation through which the current simultaneously passes to operate an item counter, and thus indicate the number of times such item occurs.

It will be understood that the perforations shown in Fig. 1 composing pattern No. 3 and pattern No. 4 may be the only perforations in these patterns or the patterns may comprise numerous other perforations. In the first instance, it is obvious that all of the data represented by the perforations in each pattern will be taken off, but in the latter instance only a portion of the total data represented by each pattern will be taken off, that is, only perforations occurring in the last two columns of the patterns and at the other positions shown in pattern No. 3 and pattern No. 4 will actuate the registering devices no matter how many other perforations may occur in these patterns.

In order to take off data represented by perforations occurring in the last two columns of some or all of the patterns, the selector is set as follows: A contact brush is positioned over each column of conducting sections of the selector corresponding with the columns of the patterns in which perforations occur that are intended to actuate the registering devices. Therefore, a contact brush will be positioned over each of the last two columns of conducting sections and these brushes will be of the type shown in Fig. 15, because it is desired to have a perforation occurring at any position in the last two columns actuate the registering devices. A brush will likewise be placed over the column of conducting sections corresponding with column $6_a$ in the pattern, because it is known that perforations will occur at position 0 in this column. As it is desirable that perforations at other positions in this column will not actuate the registering devices, a brush of the type shown in Fig. 16 is employed, for in this type of brush, the contact springs 85 are insulated from each other, and, therefore, electric current may be conducted to any one contact spring, and, in the present instance, to that spring which lies over the conducting section corresponding with the position 0 in column $6_a$ of the record strip patterns. A similar brush will be positioned over the third column of conducting sections, because it is desired that a perforation occurring in the third column of the record strip at position 1 should actuate one of the registering devices. Another brush of the type shown in Fig. 16 is positioned over the first column of conducting sections, because current is to be passed through the master holes M. All of these brushes are clearly shown in their proper positions in Fig. 9. Having thus set the contact brushes, an electrical connection is made between socket 88 and that contact spring 85 which lies over the conducting section M'' corresponding with the position at which the master holes M occur. This electrical connection is shown at 165. Another electrical connection 166 is made between socket 92 and the second contact spring of the second brush, this contact spring being the one which lies over the conducting section corresponding in position to the position of the perforation in pattern No. 3 at position 1 of column $3_a$. For a similar reason, the first contact spring of the third brush is electrically connected with socket 91, as shown at 167. Socket 87 is electrically connected with socket 1''' in selector bar $s^3$, by means of the conductor 168, and the socket 87 is also connected with socket 0''' of selector bar $s^6$ by means of the conductor 169. Socket M''' is connected with both of the brushes lying over the last two columns of conducting sections as shown at 170, and socket 90 is electrically connected with socket 92 by means of the conductor 171.

The selector is then connected with the accumulator units as follows: A plug bar 97 of the type shown in Fig. 19 is inserted in the sockets of the selector bar $s^{10}$ and its cable 96 is run to the first accumulator unit $a$ and its separate conductors are connected with the several electro-magnets in such unit. For this purpose, the cable 96 may be provided with a plug bar of the type shown in Fig. 17, and such plug bar then inserted in the sockets 138' to 138⁹ shown in Fig. 20. A second plug bar whose cable is shown at 100 in Fig. 10 is then positioned over the first plug bar 97 with the plugs of such second bar engaging in the sockets at the top of the underneath plug bar. The cable 100 is then run to accumulator $e$ and its separate conductors are connected with the electro-magnets in the same manner as described in connection with the accumulator unit $a$. In a similar manner, two plug bars are positioned over the sockets in selector bar $s^9$ and the cable 102 of the lower plug bar passes to accumulator unit $b$ and the cable 103 of the other plug bar passes to an accumulator unit $f$. The accumulator units $a$ and $b$ may be connected with the common return conductor 95 connected with socket member 92 and the accumulator units $e$ and $f$ may be connected with the common return conductor 94 connected with socket 91. Any one of the accumulator units which is not in use for another purpose may be used as the item counter. In the present instance, accumulator unit $j$ is used for this purpose and is, therefore, connected by means of the conductor 172 with the socket M'''. The return conductor for the accumulator unit $j$ is shown at 93 and is connected with the socket 90. The purpose of providing all of these conductors and connecting them in the manner just described will be more apparent from the following description of the operation of the selector.

The record strip is placed upon the spool 65 of the selector and its extremity is connected with the other spool 66 in any suitable manner. The spool 66 is rotated in any convenient way and then the shaft of the accumulator units which carries the toothed disks is rotated. It should here be noted that the spools for feeding the record strip through the selector need not rotate in synchronism with the shaft of the accumulator units, but it is essential that such shaft of the accumulator units make at least one complete revolution for each pattern of the record strip.

Now let it be assumed that a pattern, such as that shown at pattern No. 3, comes into position. As soon as the master hole M registers with the corresponding conducting section M″, thus insuring that the record strip is in proper position, current will flow from the battery B to socket 88, then through conductor 165 to the contact spring over the conducting section M″. It will then flow through the perforation M in the record strip and to the socket M‴, it being remembered that conducting section M″ is connected with socket M‴ through a connector lying under the selector bar. At this point, the current will divide and a portion thereof will pass through conductor 170 to the two brushes lying over the last two columns of conducting sections. As a perforation occurs at position 3 in column $9_a$ of the pattern, current will flow through this perforation, and then to the corresponding socket 3‴ in selector bar $s^9$. From here the current will pass through the cable 102 and through that individual conductor which is connected with the socket 3‴. This individual conductor is connected with socket $138^3$ of the accumulator unit $b$, and, therefore, current will flow to magnet $131^3$ in the accumulator unit, thus causing the counting disk of this unit to rotate until the number 3 on its periphery is visible through the opening in the front of the accumulator, provided the 0 was in reading position before the disk started to rotate. The current will then return to the selector through the common return conductor 95 to the socket 92 and will then be conducted by means of the conductor 166 to the conducting section 1″ of the third column and will pass through this conducting section as a perforation of the record strip registers therewith. The current will then pass through an underneath conductor to the socket 1‴ of the selector bar $s^8$, and then back to the battery through conductor 168 and socket 87.

It will be noted that the current divides a second time at the brushes over the last two columns of conducting sections and that portion of the current conducted to the last brush flows through conducting section 4″ as a perforation registers therewith. This conducting section is connected with socket 4‴ of the selector bar $s^{10}$ and, therefore, current flows to this socket and through that conductor of the cable 96 which is connected to this socket and to the magnet 4 in the accumulator unit $a$. The result is that the counting disk in the accumulator unit $a$ will rotate until the 4 is in reading position. The current will then return from this accumulator unit through the common return conductor 95 and pass back to the battery the same as described above in connection with the passage of the current from the accumulator unit $b$ to the battery.

When the current divides at the socket M‴, a portion passes through the conductor 172 to the accumulator unit $j$, where it operates the counting disk therein and causes it to rotate only one space. The current returns from this accumulator unit through the conductor 93 to socket 90, then through conductor 171 to socket 92, and through conductor 166 through the contact spring to which this conductor is connected, and then by the conductor 168 back to the battery. The result is that every time a pattern of the type shown in Fig. 1 at pattern No. 3 comes into operative position, the accumulator unit $j$ will be actuated, thus showing a total of the number of times such pattern occurs and the perforations occurring in the last two columns of the pattern will actuate accumulator units $a$ and $b$ as just described. It is to be noted, however, that no current will flow until the master hole M registers with the conducting section M″. Even this, however, does not complete the circuits for a perforation must occur at position 1 in column $3_a$ of the pattern or at position 0 in the column $6_a$ of the pattern before current will flow through perforations occurring in the last two columns of the pattern.

It should here be noted that all perforations occurring in the last two columns of the patterns will not actuate the same register or accumulator units. The perforations in the last two columns of pattern No. 3 may mean something entirely different from the perforations occurring in the last two columns of pattern No. 4 and the patterns are kept distinct by the position of the other perforations, that is, the perforation occurring at position 1 in column $3_a$ of pattern No. 3, and in position 0 in column $6_a$ of pattern No. 4. If a perforation exists at position 1 of column $3_a$ of the pattern, the accumulator units $a$ and $b$ will be actuated, but if a perforation occurs at position 0 of column $6_a$ of the pattern, other accumulator units, such as $e$ and $f$, will be actuated. For instance, suppose a pattern of the type shown in Fig. 1 at pattern No. 4 comes into position, current will flow from the battery B to the brushes over the last two columns of conducting sections in the same manner as described above. In the present instance, however, the current will flow through conducting section 7″ as a perforation registers therewith and through socket 7‴ of the selector bar $s^9$, then through one of the conductors of cable 103 to magnet $131^7$ of the accumulator unit $f$. The current will return from this accumulator unit through conductor 94 to socket 91, then through conductor 167 to the contact spring which lies over conducting section 0″ of the sixth column of conducting sections. As a perforation registers with this conducting section, current will pass through socket 0‴ connected with such conducting section by an underneath conductor and then back to the battery B through conductor 169 and socket 87. The counting disk in accumulator unit $f$ will then indicate 7. In a similar manner the current will pass through conducting section 6″ to socket 6‴, then through that conductor of cable 100 which is connected with magnet $131^6$ in accumulator unit $e$. The current will then return as before to the battery. The accumulator units $e$ and $f$ will then read 76. This pattern will not register in an item counter, but it is obvious that an item counter may be connected with the selector, so as to be operated by this type of pattern in the same manner as described in connection with pattern No. 3.

Now it will be noted that in order for the perforations in the last two columns of a pattern to operate the registering devices, a perforation must either occur at position 1 in column $3_a$ or at position 0 in column $6_a$. In the former instance, accumulator units $a$ and $b$ will be actuated, and in the latter instance, accumulator units $e$ and $f$ will be actuated. Thus the perforations occurring in the last two columns of pattern No. 3 may mean something entirely different from the perforations occurring in the last two columns of pattern No. 4 and the data may be read upon different sets of accumulator units.

It will now be noted that perforations occurring at other points in the pattern will have no effect upon the operation of the selector when the selector is set to be operated by patterns of the type shown at pattern No. 3 and pattern No. 4 in Fig. 1. It will also be noted that the electrical connections are made in accordance with the type of patterns that it is desired should actuate the registering devices. When the patterns are more complicated than shown at pattern No. 3 and pattern No. 4 in Fig. 1, and it is desired that all or nearly all of the perforations should actuate the registering devices, more electrical connections will be necessary, but from the foregoing explanation, it is believed that the manner in which these connections should be made is apparent. The person setting the selector knowing the necessary paths which the current should take makes the proper electrical connections between the various parts in order to allow the current to take these predetermined paths.

The specific construction of the selector renders it possible to remove the selector bars and replace them either by similar selector bars or by those of the form shown in Fig. 14. It is obvious that if a selector bar of the type shown in Fig. 14 is employed, a perforation occurring at any point in a predetermined column of a pattern may actuate a registering device, but the location of the perforation in the column will not be indicated. The manner in which the selector is constructed permits additional selector bars to be added or unnecessary selector bars removed to suit requirements.

At any time when it is desired to take off data from the record strip, the same is passed through the selector and a portion or all of the data will be taken off and indicated on the registering devices depending upon the setting of the selector. In this way the total data recorded upon the record strip may be made known at any time or certain portions thereof may be made known, such, for instance, as the quantity of goods sold during a predetermined period, the amount of profits during such period, etc. If desired, the registering devices may be located in one room and the compartment under lock and key and the selector located at another point where it may be operated by an attendant. In this way, the data indicated by the registering devices is not known to the attendant and may be made known to only those persons to whom it should be made known.

By altering the character of the record strip, or by changing the setting of the selector, or by doing both, it is obvious that the apparatus is practically unlimited in its usefulness in compiling practically any kind of data, and by simple changes in the setting of the selector, the same may be made to operate by all of the perforations in the record strip or by any predetermined combinations thereof.

So far as the specific construction and operation of certain parts of the apparatus are concerned, it is immaterial whether the record sheet takes the form of a continuous strip or web, or whether it is in the nature of a relatively short section, such as a card adapted to contain only one or probably several patterns. In either instance, the pattern is contained on a record "sheet" and the term "sheet" used in the claims is, therefore, intended to apply to either a continuous strip or a relatively short card-like section.

Although one specific form of the apparatus has been described, it is obvious that the apparatus may be constructed in various other ways to produce the same result without departing from the spirit or scope of the invention, as defined in the accompanying claims.

What we claim is:—

1. Apparatus of the kind described comprising a plurality of registering units, a data selector, a plurality of electric conductors between the selector and the registering units, a perforated record sheet, certain perforations in which represent data of one or more classes, and means associated with the selector whereby electric circuits through said conductors may be controlled by said record sheet, said conductors being detachably connected with the selector and capable of being connected therewith in a plurality of different ways depending upon which perforations of the record sheet are previously chosen to actuate the registering devices.

2. Apparatus of the kind described comprising registering mechanism, a data selector, a plurality of electric conductors between the selector and the registering mechanism, a perforated record sheet, certain perforations in which represent data of one or more classes, and means associated with the selector whereby electric circuits through said conductors may be controlled by said record sheet, said conductors being detachably connected with the selector and capable of being connected therewith in a plurality of different ways depending upon which perforations of the record sheet are previously chosen to actuate the registering mechanism.

3. Apparatus of the kind described comprising a plurality of registering units, a data selector, a plurality of electric conductors between the selector and the registering units, a perforated continuous record strip, certain perforations in which represent data of one or more classes and means associated with the selector whereby electric circuits through said conductors may be controlled by said record strip, said conductors being detachably connected with the selector and capable of being connected therewith in a plurality of different ways depending upon which perforations of the record strip are previously chosen to actuate the registering devices.

4. Apparatus of the kind described comprising registering mechanism, a data selector, a plurality of electric conductors between the selector and the registering mechanism, a perforated continuous record strip, certain perforations in which represent data of one or more classes and means associated with the selector whereby electric circuits through said conductors may be controlled by said record strip, said conductors being detachably connected with the selector and capable of being connected therewith in a plurality of different ways depending upon which perforations of the record strip are previously chosen to actuate the registering mechanism.

5. Apparatus of the kind described comprising registering mechanism, a data selector, a plurality of electric conductors between the selector and the registering mechanism, a perforated record sheet, certain perforations in which represent data of one or more classes, and means associated with the selector whereby electric circuits through said conductors may be controlled by said record strip, a plurality of sockets associated with the selector and plugs on the extremities of said conductors for inserting in said sockets whereby the conductors may be connected with the selector in a plurality of different ways depending upon which perforations of the record sheet are previously chosen to actuate the registering devices.

6. Apparatus of the kind described comprising registering mechanism, a data selector, a plurality of electric conductors between the selector and the registering mechanism, a perforated record sheet, certain perforations in which represent data of one or more classes, and means associated with the selector whereby electric circuits through said conductors may be controlled by said record strip, said conductors having a plug and socket connection with the selector whereby the conductors may be connected with the selector in a plurality of different ways, for the purpose described.

7. Apparatus of the kind described comprising electrically actuated registering mechanism, a perforated-sheet-controlled data selector, a perforated record sheet, certain perforations in which represent data in one or more classes, a terminal board associated with the data selector, and a plurality of electric conductors detachably connected with said terminal board and running to said registering mechanism.

8. Apparatus of the kind described comprising electrically-actuated registering mechanism, a perforated-sheet-controlled data selector, a perforated record sheet, certain perforations in which represent data in one or more classes, a terminal board associated with the data selector having a plurality of sockets and a plurality of electric conductors running to the registering mechanism and having plugs for insertion in the sockets of the terminal board.

9. Apparatus of the kind described comprising electrically-actuated registering mechanism, a perforated-sheet-controlled data selector, a perforated record sheet, certain perforations in which represent data in one or more classes, a terminal board associated with the data selector, a plurality of electric conductors running to the registering mechanism, and plug and socket connections between said conductors and the terminal board.

10. Apparatus of the kind described comprising registering mechanism, a data selector having a conducting surface provided with a plurality of separate electrical conducting sections, a perforated record sheet, certain perforations in which represent data of one or more classes, means whereby the perforations in said record sheet may complete electric circuits through said conducting sections, and electric conductors connected with said registering mechanism and capable of being electrically connected with said conducting sections in various ways depending upon which perforations of the record sheet are previously chosen to actuate the registering mechanism.

11. Apparatus of the kind described comprising registering mechanism, a data selector having a conducting surface provided with a plurality of separate electrical conducting sections, a perforated record sheet, certain perforations in which represent data of one or more classes, means whereby the perforations in said record sheet may complete electric circuits through said conducting sections, and means whereby each of said conducting sections may be electrically and separately connected with the registering mechanism.

12. Apparatus of the kind described comprising a plurality of registering units, a data selector having a conducting surface provided with a plurality of separate electrical conducting sections, a perforated record sheet, certain perforations in which represent data of one or more classes, means whereby the perforations in said record sheet may complete electric circuits through said conducting sections, and means whereby a plurality of said conducting sections may be electrically and separately connected with one of said registering units.

13. Apparatus of the kind described comprising a plurality of registering units, a data selector having a conducting surface provided with a plurality of separate electrical conducting sections, a perforated record sheet, certain perforations in which represent data of one or more classes, means whereby the perforations in said record sheet may complete electric circuits through said conducting sections, and means whereby each of said registering units may be electrically connected with the conducting sections of a predetermined group of such conducting sections.

14. Apparatus of the kind described comprising a plurality of registering units, a data selector having a conducting surface provided with a plurality of separate electrical conducting sections, a perforated record sheet, certain perforations in which represent data of one or more classes, means whereby the perforations in said record sheet may complete electric circuits through said conducting sections, and electrical conductors for separately connecting the conducting sections of a predetermined group of such conducting sections with any one of said registering units.

15. Apparatus of the kind described comprising a plurality of registering units, a data selector having a conducting surface provided with a plurality of separate electrical conducting sections arranged in predetermined groups, a perforated record sheet, certain perforations in which represent data of one or more classes, means whereby the perforations in said record sheet may complete electric circuits through said conducting sections, and means whereby the conducting sections of any group may be electrically and separately connected with any one of said registering units.

16. Apparatus of the kind described comprising a plurality of registering units, a data selector having a conducting surface provided with separate conducting sections arranged in a plurality of columns on the conducting surface, a perforated record sheet, certain perforations in which represent data of one or more classes, means whereby the perforations in said record sheet may complete electric circuits through said conducting sections, and means whereby each of the conducting sections of any column of such conducting sections may be separately and electrically connected with any one of said registering units.

17. Apparatus of the kind described comprising registering mechanism, a perforated record sheet, certain perforations in which represent data of one or more classes, a data selector having a conducting surface provided with separate electrical conducting sections, there being one of such sections for each position of the record sheet at which a perforation might occur, and means whereby said conducting sections may be electrically and separately connected with the registering mechanism.

18. Apparatus of the kind described comprising registering mechanism, a data selector, a plurality of electric conductors between the selector and the registering mechanism, a perforated record sheet, certain perforations in which represent data of one or more classes, said selector having a plurality of separate electrical conducting sections, there being one of such sections for each position of the record sheet at which a perforation might occur, means associated with the selector whereby electric circuits through said conductors may be controlled by said record sheet, said conductors being detachably connected with the selector and capable of being connected therewith in a plurality of different ways depending upon which perforations of the record sheet are previously chosen to actuate the registering mechanism.

19. Apparatus of the kind described comprising a plurality of registering units, a plurality of electro-magnets associated with each of said units, a perforated-sheet-controlled data selector having a plurality of separate electrical conducting sections, a perforated record sheet, certain perforations in which represent data of one or more classes, means whereby electric circuits may be completed by the perforations in said sheet through said conducting sections, and means whereby the conducting sections of a predetermined group may be electrically and separately connected with the electro-magnets in any registering unit.

20. Apparatus of the kind described comprising a plurality of registering units each having a plurality of electro-magnets, a perforated-sheet-controlled data selector having a conducting surface provided with a plurality of separate conducting sections arranged in columns, a perforated record sheet, certain perforations in which represent data of one or more classes, means whereby electric circuits may be completed by the perforations in said sheet through said conducting sections, and means whereby the conducting sections of any column may be electrically and separately connected with the electro-magnets in any registering unit.

21. Apparatus of the kind described comprising a plurality of registering units each having a plurality of electro-magnets, a perforated-sheet-controlled data selector having a conducting surface provided with a plurality of separate conducting sections, a perforated record sheet, certain perforations in which represent data of one or more classes, means whereby electric circuits may be completed by the perforations in said sheet through said conducting sections, and a plurality of electric conductors for connecting the electro-magnets of any registering unit with a corresponding number of separate conducting sections of the selector.

22. Apparatus of the kind described comprising a plurality of registering units each having a plurality of electro-magnets, a perforated-sheet-controlled data selector having a conducting surface provided with a plurality of separate conducting sections, a perforated record sheet, certain perforations in which represent data of one or more classes, means whereby electric circuits may be completed by the perforations in said sheet through said conducting sections, and a plurality of electric conductors for connecting the electro-magnets of any registering unit with a corresponding number of separate conducting sections of the selector, said conductors being detachably connected with the selector and capable of being connected with the conducting sections of any one of a number of different groups of such sections depending upon which perforations of the record sheet are previously chosen to actuate the registering unit.

23. Apparatus of the kind described comprising a plurality of registering units, a plurality of electro-magnets associated with each of such units, a data selector having a conducting surface provided with a plurality of series of conducting sections, a perforated record sheet, certain perforations in which represent data of one or more classes, means whereby electric circuits may be completed by the perforations in said sheet through said conducting sections, and means whereby the conducting sections of any series may be electrically and separately connected with the electro-magnates in one registering unit.

24. Apparatus of the kind described comprising a plurality of registering units, a plurality of electro-magnets associated with each of such units, a data selector having a conducting surface provided with a plurality of series of conducting sections, a perforated record sheet, certain perforations in which represent data of one or more classes, means whereby electric circuits may be completed by the perforations in said sheet through said conducting sections, and means whereby each conducting section of one series may be electrically connected with one magnet of a registering unit, all of the conducting sections of said series being thus separately connected with the magnets of one registering unit.

25. Apparatus of the kind described comprising a plurality of registering units each having a plurality of electro-magnets, a data selector having a conducting surface provided with a plurality of electrical conducting sections arranged in columns, a perforated record sheet, certain perforations in which represent data of one or more classes, means whereby electric circuits may be completed by the perforations in said record sheet through said conducting sections, said means comprising a brush adapted to be supported over the conducting sections of one series and under which the record may pass, and means whereby said conducting sections may be electrically and separately connected with the electro-magnets of one registering unit.

26. Apparatus of the kind described comprising a plurality of registering units each having a counting disk and nine electro-magnets, means whereby each of such magnets when energized permits said disk to move a predetermined amount, a data selector having a conducting surface provided with a plurality of separate electrical conducting sections, a perforated record sheet, certain of said perforations representing data of one or more classes, means whereby electric circuits may be completed by the perforations in said sheet through said conducting sections, and means whereby each of said conducting sections of a predetermined group may be electrically connected with a corresponding magnet in one of the registering units.

27. Apparatus of the kind described comprising a plurality of registering units each having a counting disk and nine electro-magnets, means whereby each of such magnets when energized permits said disk to move a predetermined amount, a data selector having a conducting surface provided with a plurality of separate electrical conducting sections, arranged in columns, a perforated record sheet, certain of said perforations representing data of one or more classes, means whereby electric circuits may be completed by the perforations in said sheet through said conducting sections, and means whereby the conducting sections of any column of such sections may be electrically and separately connected with the electro-magnets of one registering unit.

28. Apparatus of the kind described comprising a plurality of registering units each having a counting disk, a plurality of electro-magnets in each unit, each of said magnets adapted when energized to permit the counting disk to move a predetermined amount, a perforated record sheet, certain perforations in which represent data of one or more classes, a data selector electrically connected with the magnets of at least one registering unit, and means associated with said selector whereby perforations occurring at predetermined positions on the record sheet may be made to complete an electric circuit through a predetermined one of said magnets.

29. Apparatus of the kind described comprising a plurality of registering units each having a counting disk, a plurality of electro-magnets in each unit, each of said magnets adapted when energized to permit the counting disk to move a predetermined amount, carrying mechanism for imparting movement to each counting disk when the preceding disk makes substantially one revolution, a perforated record sheet, certain of said perforations representing data of one or more classes, a data selector having a plurality of electrical conducting sections arranged in columns and through which electric circuits may be completed by perforations in said record sheet, and means whereby the electro-magnets in any registering unit may be electrically and separately connected with the electrical conducting sections of any of said columns.

30. Apparatus of the kind described comprising a plurality of registering units each having a counting disk, a plurality of electro-magnets in each unit, each of said magnets adapted when energized to permit the counting disk to move a predetermined amount, a perforated record sheet, certain perforations in which represent data of one or more classes, a data selector having a plurality of separate conducting sections arranged in columns and through which circuits may be completed by perforations in the record sheet, means whereby the magnets of any registering unit may be separately and electrically connected with the conducting sections of any of said columns, and means to supply current to any desired number of said conducting sections, the passage of such current through the conducting sections to the registering units being controlled by said record strip.

31. Apparatus of the kind described comprising a registering device having a plurality of electro-magnets associated therewith, a data selector having a series of separate electrical conducting sections, a series of sockets associated with the selector, an electrical connection between each of said conducting sections and the corresponding socket, means to establish an electrical connection between each of said sockets and the corresponding magnet in the registering unit, a perforated record sheet, certain of said perforations representing data of one or more classes, and means whereby electric circuits may be completed by the perforations in said sheet through said sections and the corresponding sockets of the selector and corresponding magnets of the registering unit.

32. Apparatus of the kind described comprising a registering device having a plurality of electro-magnets associated therewith, a data selector having a series of separate electrical conducting sections, a series of sockets associated with the selector, an electrical connection between each of said conducting sections and the corresponding socket, a perforated record sheet, certain of said perforations representing data of one or more classes, means whereby an electric circuit may be completed by the perforations in said sheet through said conducting sections, and a plurality of electric conductors connected with the magnets in said registering device and having detachable connections with said sockets.

33. Apparatus of the kind described comprising a registering device having a plurality of electro-magnets associated therewith, a data selector having a series of separate electrical conducting sections, a terminal board associated with the selector having a series of electric connectors each of which is electrically connected with one of said conducting sections, a plurality of electric conductors connected with the magnets in said registering device and having connectors by means of which they may be detachably connected with the connectors of said terminal board, a perforated record sheet, certain of said perforations representing data of one or more classes, and means whereby electric circuits may be completed by the perforations in said sheet through said conducting sections.

34. Apparatus of the kind described comprising a registering device having a counting disk, a plurality of electro-magnets each of which is adapted when energized to permit the counting disk to move a predetermined amount, a data selector having a series of separate electrical conducting sections, means whereby each of such sections may be electrically and separately connected with a corresponding magnet in the registering device, a perforated record sheet, certain of said perforations representing data of one or more classes, the perforations of which are adapted to register with the conducting sections in said series, a brush adapted to be positioned over the conducting sections of such series and under which the record sheet passes, and means to supply said brush with electric current.

35. Apparatus of the kind described comprising a registering device having a counting disk, a plurality of electro-magnets each of which is adapted when energized to permit the counting disk to move a predetermined amount, a data selector having a series of separate electrical conducting sections, means whereby each of such sections may be electrically and separately connected with a corresponding magnet in the registering device, a perforated record sheet, the perforations of which are adapted to register with the conducting sections in said series, and means to supply electric current to points above any desired number of said conducting sections, the passage of such current to the magnets of the registering device being controlled by said perforated sheet.

36. Apparatus of the kind described comprising a data selector having a plurality of series of separate electrical conducting sections, means whereby a perforated record strip may be passed over said sections, and a contact brush adapted to be removably supported over the conducting sections of any series, for the purpose described.

37. Apparatus of the kind described comprising a data selector having a plurality of series of electrical conducting sections, means whereby a perforated record strip may be passed over said conducting sections, a terminal board comprising a plurality of sockets, each of which is electrically connected with a corresponding conducting section, a plurality of registering devices, means to establish electrical connection between said sockets of the terminal board and said registering devices, and means whereby electric circuits may be completed by the perforations of said record strip through said conducting sections of the selector.

38. Apparatus of the kind described comprising a registering device having a plurality of electro-magnets, a data selector having a series of electrical conducting sections, a perforated record sheet, certain perforations in which represent data of one or more classes, means whereby electric circuits may be completed by the perforations in said record sheet through said conducting sections, a terminal board having a series of sockets each of which is electrically connected with one of said conducting sections, a plug bar having a plurality of plugs for insertion in the sockets of said terminal board, and a conductor electrically connected with each of said plugs and with the corresponding magnet in said registering device.

39. Apparatus of the kind described comprising a plurality of registering devices each having a plurality of electro-magnets, a data selector having a plurality of series of conducting sections arranged in columns, a terminal board having a plurality of series of sockets arranged in columns, each of said sockets being electrically connected with one of said conducting sections of a corresponding series, a perforated record sheet, certain of said perforations representing data of one or more classes, means whereby electric circuits may be completed by the perforations in said sheet through said conducting sections, a plug bar having a plurality of plugs capable of being inserted in the sockets of any column of such sockets, and an electrical connection between each plug of said plug bar and a corresponding magnet in the registering device.

40. A data selector of the kind described comprising a plurality of series of electrical conducting sections, means whereby a perforated record strip may be passed over said sections, means whereby electric circuits may be completed by said perforations through said sections, and a terminal board comprising a plurality of series of connectors each of which is electrically connected with one of the conducting sections in a corresponding series.

41. A data selector of the kind described comprising a conducting surface made up of a plurality of separate bars each having an electrical conducting section, means whereby a perforated record strip may be passed over said conducting sections, means whereby electric circuits may be completed by the perforations of said strip through said conducting sections, each of said bars having an extension forming a terminal board, a plurality of connectors carried by said extensions of the bars, and an electrical connection between each conducting section and the corresponding connector of the terminal board.

42. A data selector of the kind described comprising a conducting surface having a plurality of separate electrical conducting sections, means whereby a perforated record strip may be passed over said surface, means whereby electric circuits may be completed by the perforations in said record strip through said conducting sections, a terminal board having a plurality of sockets, and electric conductors having plug-like extremities for insertion in the sockets of said terminal board whereby said sockets may be electrically connected with any desired part of the selector or other apparatus.

43. Apparatus of the kind described comprising a data selector having a plurality of separate conducting sections, means whereby a perforated record sheet may be passed over said conducting sections, said conducting sections being positioned to register with the perforations in the record sheet, registering mechanism electrically connected with said conducting sections, means whereby electric circuits may be completed by the perforations in said record sheet through said conducting sections, and means whereby said record sheet must be in operative position with respect to said conducting sections before any current will flow through the perforations of said record strip.

44. Apparatus of the kind described, comprising a plurality of registering units, a perforated record sheet, certain perforations in which represent data of one or more classes, means for selecting data from the record sheet, and means actuated by said last mentioned means for operating the registers.

45. Apparatus of the kind described, comprising a plurality of registering units, a perforated record sheet, certain perforations in which represent data of one or more classes, means for selecting the data of any one class or group of classes, and means actuated by said last mentioned means for operating the registers.

46. Apparatus of the kind described, including a plurality of registering units, a perforated record sheet, certain perforations in which represent classes of data and other perforations in which represent data of the classes, a selector controlled by the first mentioned perforations constructed and arranged to be operated by the perforations representing the data of any one class or any group of classes.

47. Apparatus of the kind described, including a perforated record sheet, certain perforations in which represent classes of data and other perforations in which represent the data of the classes, and a selector constructed and arranged to be operated by the perforations representing the data of any one class or group of classes.

48. Apparatus of the kind described, including a perforated record sheet, certain perforations in which represent classes of data and other perforations in which represent data of the classes, a selector under the control of the first mentioned perforations constructed and arranged to be operated by the perforations representing the data of one class or any group of classes, said record sheet having certain perforations therein for causing the proper positioning of the sheet.

In testimony whereof we affix our signatures.

WAYLAND BLAIR CLARK.
FREDERICK J. PRITCHARD.